(12) United States Patent
Johnson et al.

(10) Patent No.: US 12,128,415 B2
(45) Date of Patent: Oct. 29, 2024

(54) APPARATUSES FOR CONTACTLESS LOADING AND IMAGING OF MICROFLUIDIC CHIPS AND RELATED METHODS

(71) Applicant: Pattern Bioscience, Inc., Austin, TX (US)

(72) Inventors: Ross Johnson, Austin, TX (US); Jonathan Isom, Austin, TX (US); David Bussian, Austin, TX (US); Nicolas Arab, Austin, TX (US)

(73) Assignee: Pattern Bioscience, Inc., Austin, TX (US)

( * ) Notice: Subject to any disclaimer, the term of this patent is extended or adjusted under 35 U.S.C. 154(b) by 25 days.

(21) Appl. No.: 17/195,206

(22) Filed: Mar. 8, 2021

(65) Prior Publication Data

US 2021/0331178 A1    Oct. 28, 2021

Related U.S. Application Data

(63) Continuation of application No. 16/858,282, filed on Apr. 24, 2020, now Pat. No. 10,953,404.

(51) Int. Cl.
*B01L 9/00* (2006.01)
*B01L 1/02* (2006.01)
(Continued)

(52) U.S. Cl.
CPC .............. *B01L 9/527* (2013.01); *B01L 1/02* (2013.01); *B01L 3/502715* (2013.01);
(Continued)

(58) Field of Classification Search
None
See application file for complete search history.

(56) References Cited

U.S. PATENT DOCUMENTS 4,452,432 A    6/1984   Ehlert et al.
5,609,828 A    3/1997   O'Bear et al.
(Continued)

FOREIGN PATENT DOCUMENTS

EP    2131869    12/2009
EP    2482983    8/2012
(Continued)

OTHER PUBLICATIONS

Beer, et al., "On-Chip, Real-Time, Single-Copy Polymerase Chain Reaction in Picoliter Droplets," Anal. Chem, 79: 8471-8475, 2007.
(Continued)

*Primary Examiner* — P. Kathryn Wright
(74) *Attorney, Agent, or Firm* — Norton Rose Fulbright US LLP

(57) ABSTRACT

An apparatus for loading and imaging a microfluidic chip can comprise a housing having walls that define a vacuum chamber and a first receptacle disposed within the vacuum chamber, the first receptacle defining a space for receiving one or more microfluidic chips. The apparatus can also include a negative pressure source, a light source, and an optical sensor coupled to the housing. The negative pressure source can be configured to reduce pressure within the vacuum chamber, the light source can be positioned to illuminate at least a portion of the space for receiving the chip(s), and the optical sensor can be positioned to capture an image of at least a portion of the space for receiving the chip(s).

18 Claims, 18 Drawing Sheets

(51) Int. Cl.
*B01L 3/00* (2006.01)
*G01N 21/31* (2006.01)

(52) U.S. Cl.
CPC ..... *B01L 3/50273* (2013.01); *B01L 3/502784* (2013.01); *G01N 21/31* (2013.01); *B01L 2200/0642* (2013.01); *B01L 2200/0647* (2013.01); *B01L 2300/0663* (2013.01); *B01L 2400/049* (2013.01)

(56) References Cited

U.S. PATENT DOCUMENTS

| | | | |
|---|---|---|---|
| 5,762,873 | A | 6/1998 | Fanning et al. |
| 5,965,090 | A | 10/1999 | Fanning et al. |
| 6,673,578 | B1 | 1/2004 | Uemori et al. |
| 6,990,290 | B2 | 1/2006 | Kylberg et al. |
| 7,029,091 | B2 | 4/2006 | Stellbrink et al. |
| 7,150,999 | B1 | 12/2006 | Shuck |
| 7,655,470 | B2 | 2/2010 | Ismagilov et al. |
| 7,901,939 | B2 | 3/2011 | Ismagilov et al. |
| 8,071,319 | B2 | 12/2011 | Metzger et al. |
| 8,528,589 | B2 | 9/2013 | Miller et al. |
| 8,716,007 | B2 | 5/2014 | Battrell et al. |
| 8,871,444 | B2 | 10/2014 | Griffiths et al. |
| 8,889,083 | B2 | 11/2014 | Ismagilov et al. |
| 9,089,844 | B2 | 7/2015 | Hiddessen et al. |
| 9,090,885 | B2 | 7/2015 | Boedicker et al. |
| 9,126,160 | B2 | 9/2015 | Ness et al. |
| 9,133,009 | B2 | 9/2015 | Baroud et al. |
| 9,216,392 | B2 | 12/2015 | Hindson et al. |
| 9,347,059 | B2 | 5/2016 | Saxonov |
| 9,427,737 | B2 | 8/2016 | Heredia et al. |
| 9,477,233 | B2 | 10/2016 | Ismagilov et al. |
| 9,500,664 | B2 | 11/2016 | Ness et al. |
| 9,513,207 | B2 | 12/2016 | Smith et al. |
| 9,556,470 | B2 | 1/2017 | Link et al. |
| 9,562,837 | B2 | 2/2017 | Link |
| 9,588,025 | B2 | 3/2017 | Fraden et al. |
| 9,636,682 | B2 | 5/2017 | Hiddessen et al. |
| 9,649,635 | B2 | 5/2017 | Hiddessen et al. |
| 9,657,327 | B2 | 5/2017 | Metzger et al. |
| 9,664,619 | B2 | 5/2017 | Boehm et al. |
| 9,797,010 | B2 | 10/2017 | Weitz et al. |
| 9,816,133 | B2 | 11/2017 | Baroud et al. |
| 9,878,325 | B2 | 1/2018 | Weitz et al. |
| 9,925,501 | B2 | 3/2018 | Griffiths et al. |
| 9,968,933 | B2 | 5/2018 | Ismagilov et al. |
| 10,081,017 | B2 | 9/2018 | Lee et al. |
| 10,202,571 | B2 | 2/2019 | Boedicker et al. |
| 10,371,699 | B2 | 8/2019 | Griffiths et al. |
| 10,486,155 | B1 | 11/2019 | Arab et al. |
| 10,501,789 | B2 | 12/2019 | Baroud et al. |
| 10,512,910 | B2 | 12/2019 | Colston et al. |
| 10,662,470 | B2 | 5/2020 | Arab et al. |
| 11,661,577 | B2 | 5/2023 | Boedicker et al. |
| 2005/0084923 | A1 | 4/2005 | Mueller et al. |
| 2005/0087122 | A1 | 4/2005 | Ismagilov et al. |
| 2006/0094119 | A1 | 5/2006 | Ismagilov et al. |
| 2007/0172954 | A1 | 7/2007 | Ismagilov et al. |
| 2008/0175760 | A1 | 7/2008 | Justin et al. |
| 2008/0277606 | A1* | 11/2008 | Wang ............... B01L 3/5027 264/21 |
| 2009/0000690 | A1* | 1/2009 | Oldham ............ B01L 3/502723 141/4 |
| 2009/0066339 | A1* | 3/2009 | Glezer .............. B01L 3/502715 250/493.1 |
| 2010/0163109 | A1 | 7/2010 | Fraden et al. |
| 2010/0227767 | A1 | 9/2010 | Boedicker et al. |
| 2010/0228513 | A1 | 9/2010 | Roth et al. |
| 2010/0317085 | A1 | 12/2010 | Boedicker et al. |
| 2012/0052560 | A1* | 3/2012 | Knight ............... G01N 35/1095 435/286.1 |
| 2014/0045704 | A1 | 2/2014 | Jovanovich et al. |
| 2014/0219870 | A1* | 8/2014 | Ryu ................. G01N 21/05 422/69 |
| 2016/0001289 | A1 | 1/2016 | Hung |
| 2016/0145558 | A1 | 5/2016 | Boedicker et al. |
| 2016/0257990 | A1 | 9/2016 | Di Carlo |
| 2016/0271576 | A1 | 9/2016 | Arab et al. |
| 2017/0056886 | A1 | 3/2017 | Hiddessen et al. |
| 2017/0065979 | A1 | 3/2017 | Ness et al. |
| 2017/0144116 | A1 | 5/2017 | Ness et al. |
| 2017/0151558 | A1 | 6/2017 | Hiddessen et al. |
| 2017/0239656 | A1* | 8/2017 | Linder ............... G01N 21/59 |
| 2018/0037934 | A1 | 2/2018 | Baroud et al. |
| 2018/0291419 | A1 | 10/2018 | Richards et al. |
| 2018/0297025 | A1* | 10/2018 | Dangla ............ B01L 3/502715 |
| 2019/0218497 | A1 | 7/2019 | Boedicker et al. |
| 2019/0255531 | A1 | 8/2019 | Hindson et al. |
| 2022/0219172 | A1* | 7/2022 | Soto-Moreno .......... B01L 9/527 |

FOREIGN PATENT DOCUMENTS

| | | |
|---|---|---|
| EP | 2552823 | 2/2013 |
| EP | 2903738 | 8/2015 |
| EP | 3027321 | 6/2016 |
| EP | 3314008 B1 | 12/2019 |
| FR | 1259566 | 4/1961 |
| FR | 2950544 | 4/2011 |
| FR | 2958186 | 10/2011 |
| WO | WO 2003/025113 | 3/2003 |
| WO | WO 2009/015390 | 1/2009 |
| WO | WO 2009/048673 | 4/2009 |
| WO | WO 2015/160919 | 10/2015 |
| WO | WO 2016/170126 | 10/2016 |
| WO | WO 2018/098438 | 5/2018 |

OTHER PUBLICATIONS

Chang, et al., "Droplet-Based Microfluidic Platform for Heterogeneous Enzymatic Assays," *Lab Chip*, 13, 1817-1822, 2013.
Hatch, et al., "1-Million Droplet Array With Wide-Field Fluorescence Imaging for Digital PCR," *Lab Chip*, 11, 3838-3845, 2011.
International Search Report and Written Opinion issued in Corresponding International Application No. PCT/US2019/027636, dated Jun. 26, 2019.
International Search Report and Written Opinion Issued in Corresponding PCT Patent Application No. PCT/US2019/57392, dated Feb. 27, 2020.
Nakajima & Kobayashi, "Microchannel Emulsification Technology for Production of Monosized Droplets, Microcapsules, and Microbubbles," pp. 1-4, XVI International Conference on Bioencapsulation, Sep. 4-6, 2008, Dublin, Ireland.
Office Action Issued in Corresponding U.S. Appl. No. 16/252,304, dated May 15, 2019.
Office Action Issued in Corresponding U.S. Appl. No. 16/252,304, dated Mar. 25, 2019.
Office Action Issued in Corresponding U.S. Appl. No. 16/795,337, dated Apr. 24, 2020.
Schuler, et al., "Centrifugal Step Emulsification Applied for Absolute Quantification of Nucleic Acids by Digital Droplet RPA," *Lab Chip*, 15, 2759-2766, 2015.
Shah, et al., "Designer Emulsions Using Microfluids," *Materials Today*, 11(4): 18-27, 2008.
Teh, et al., "Droplet Microfluidics," *Lab Chip*, 8: 198-220, 2008.
Extended European Search Report issued in corresponding European Application No. 21793481.9, dated Jun. 5, 2024.

* cited by examiner

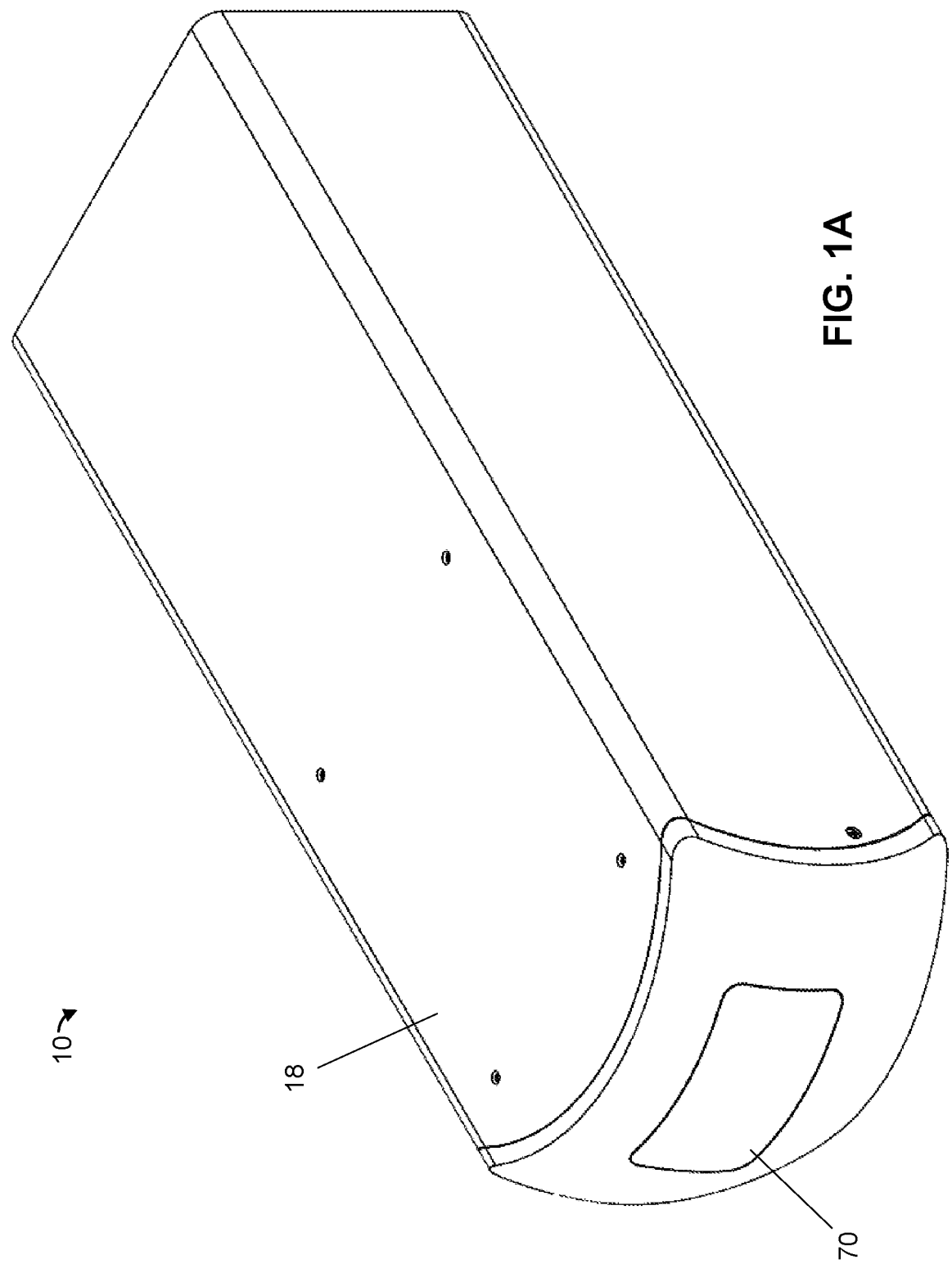

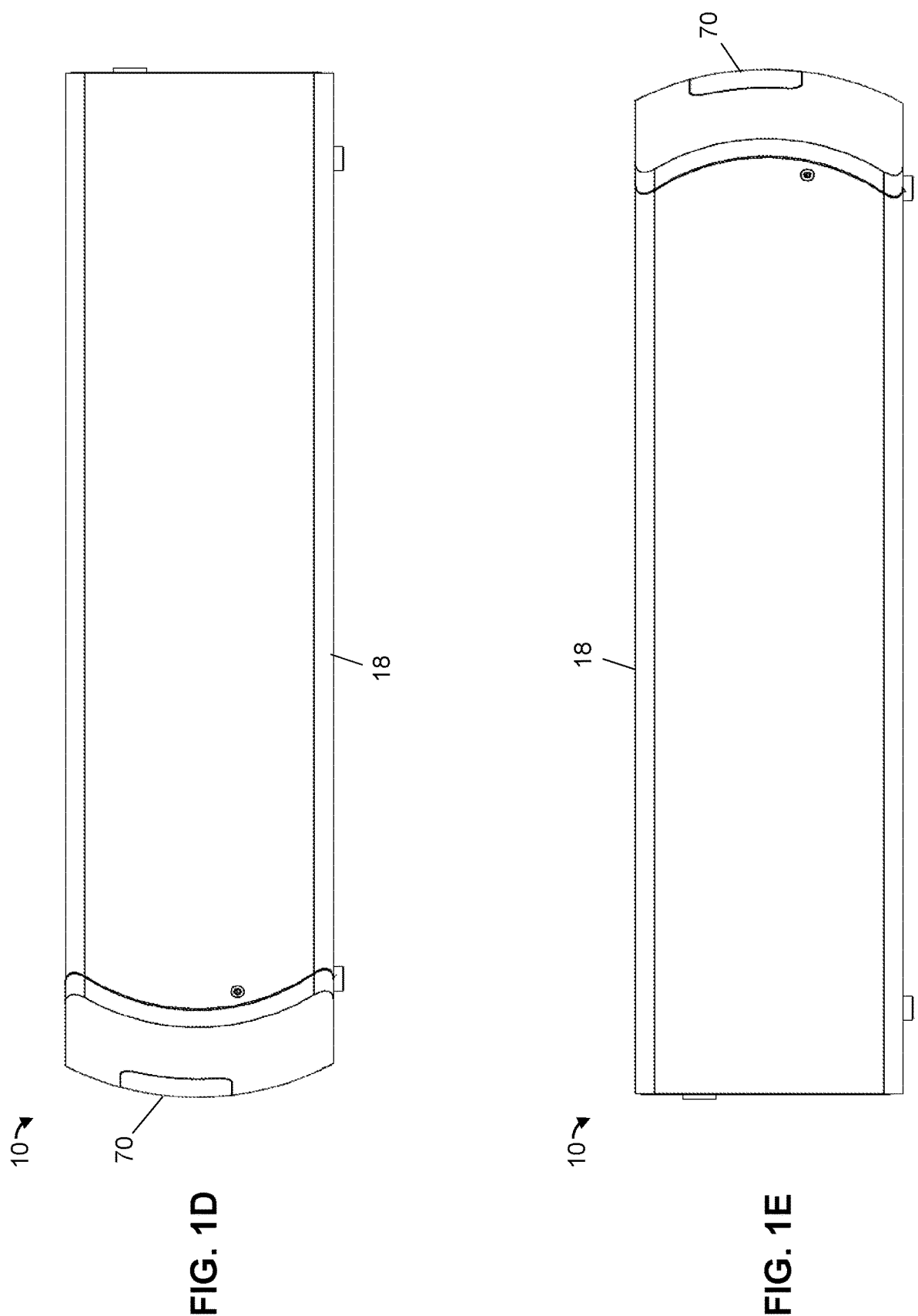

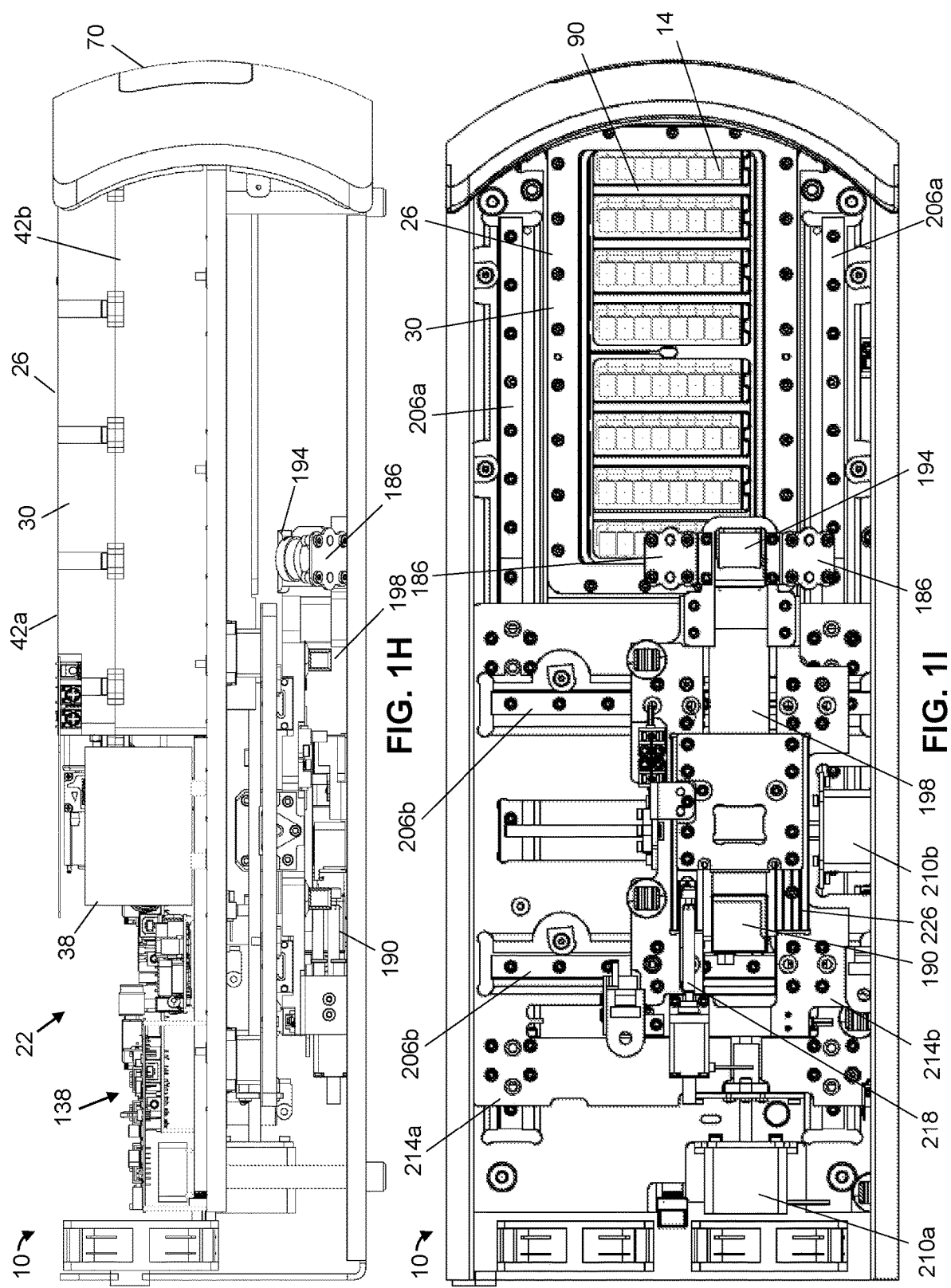

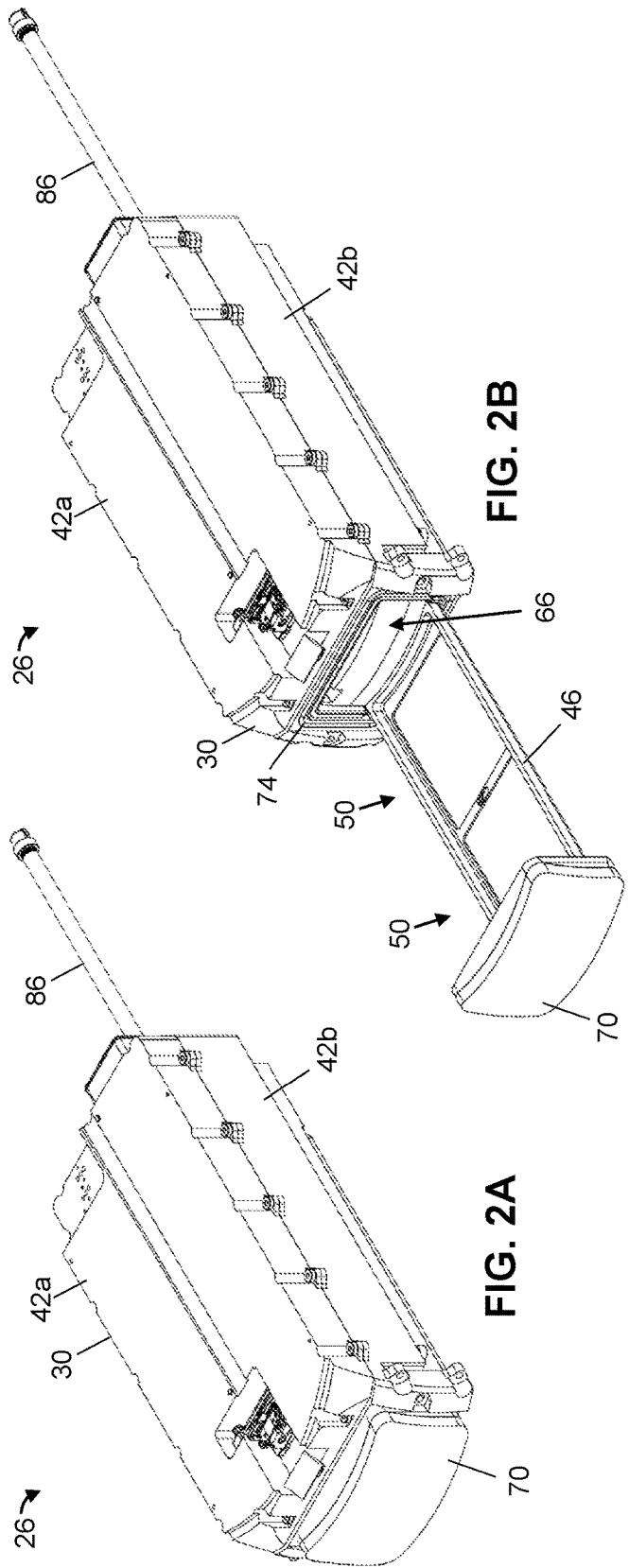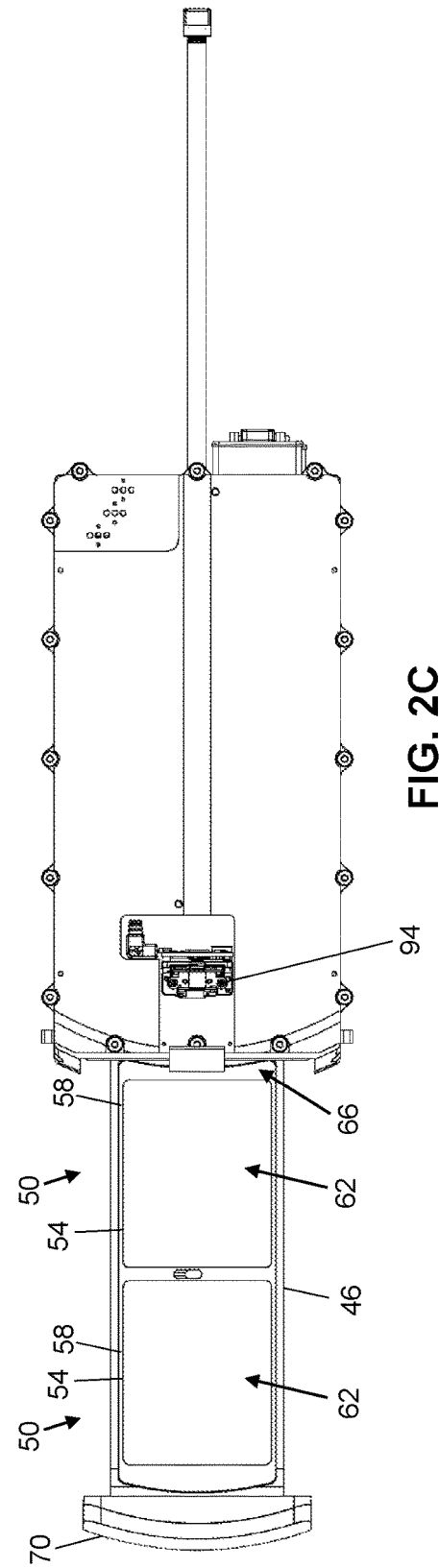

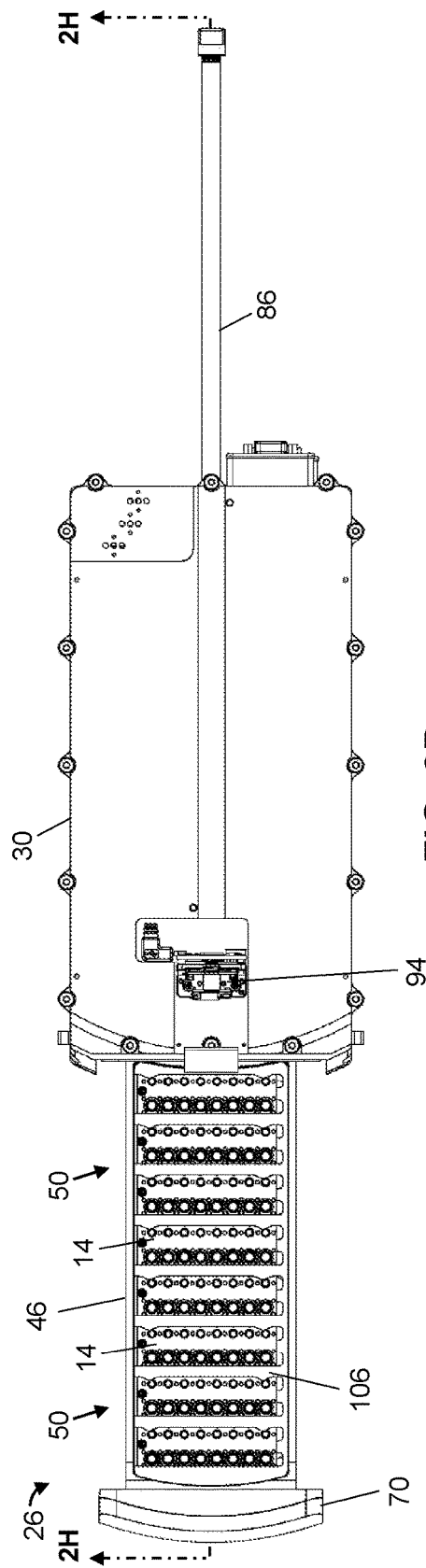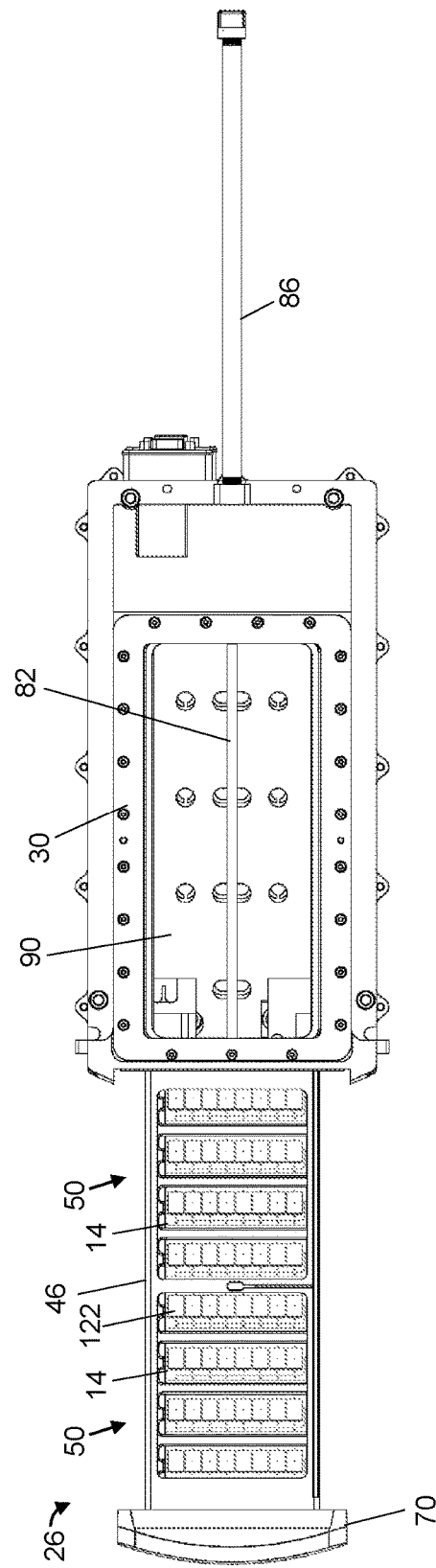

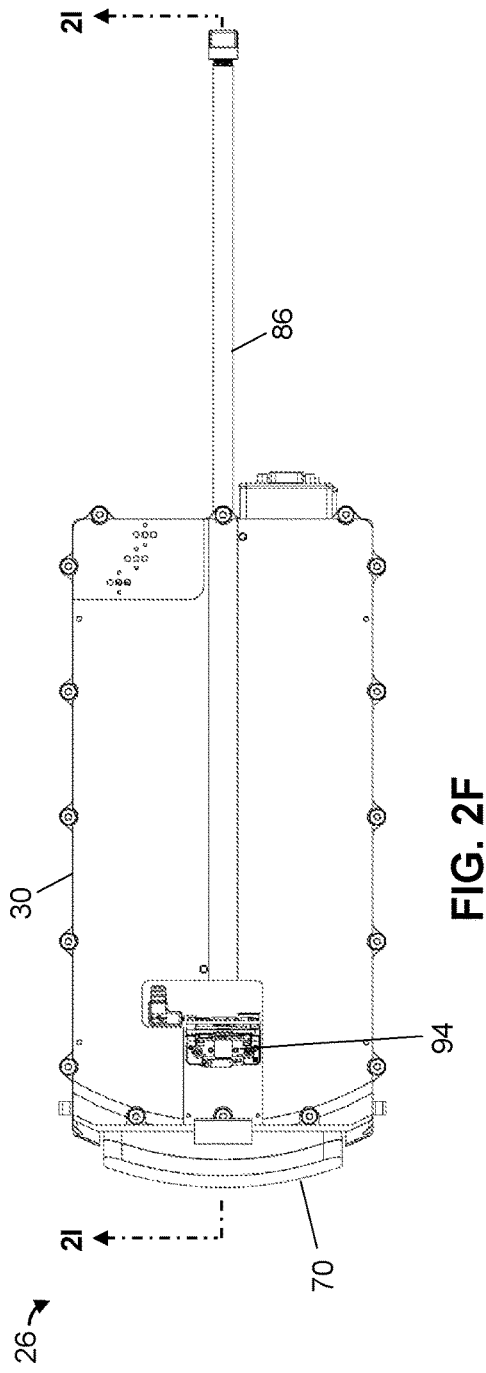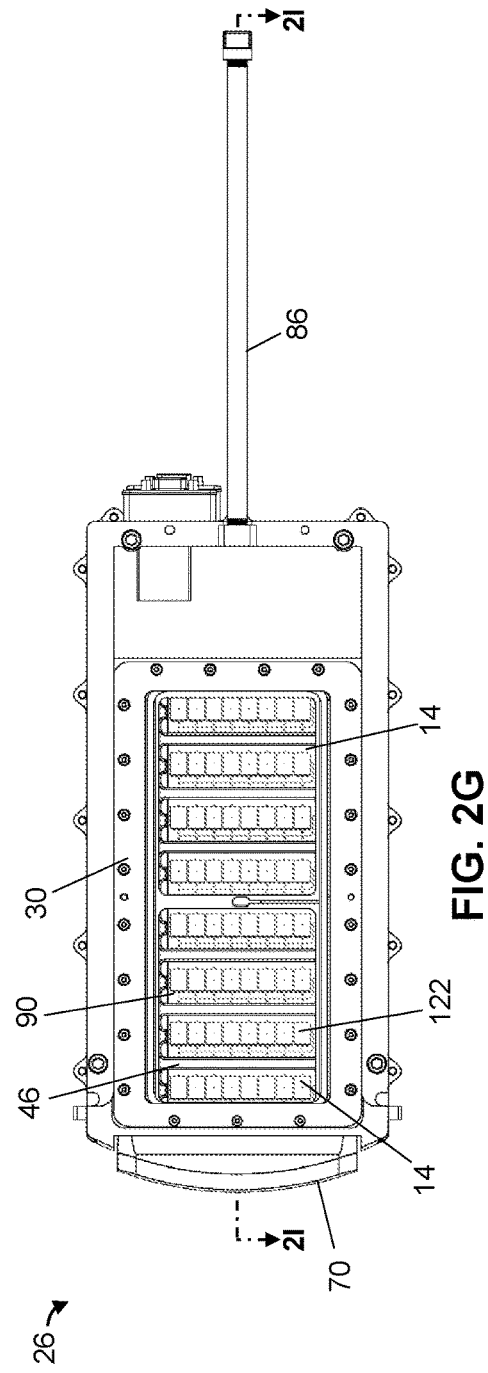

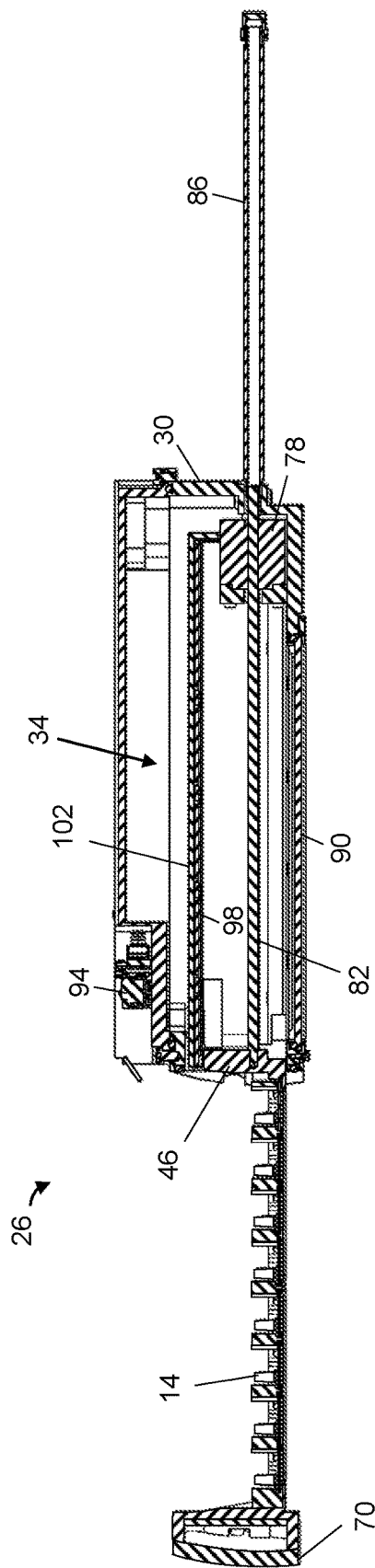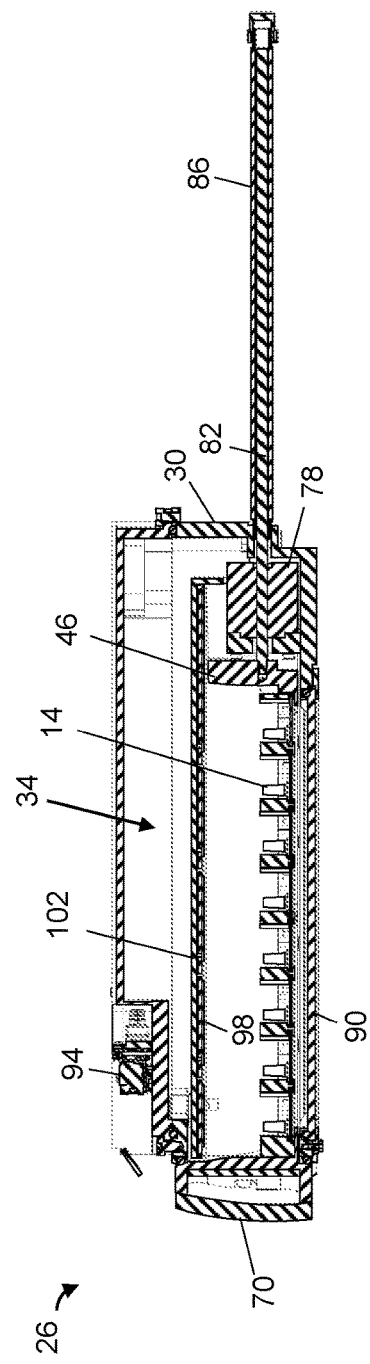
FIG. 2H
FIG. 2I

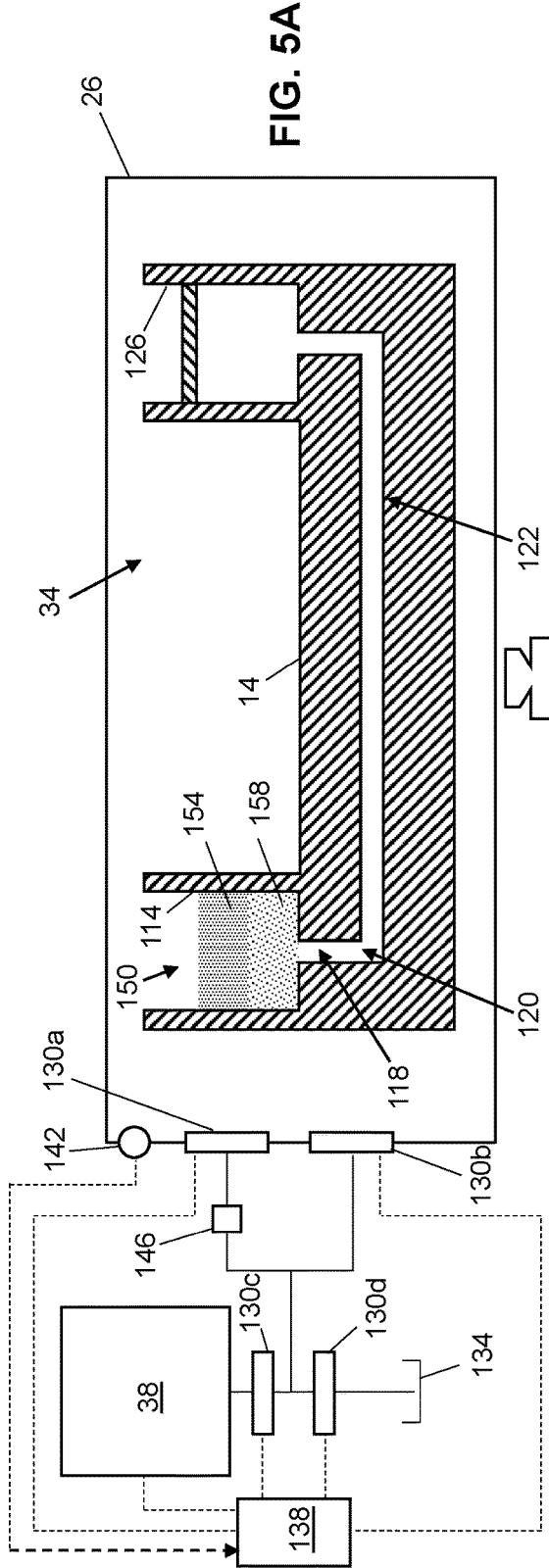
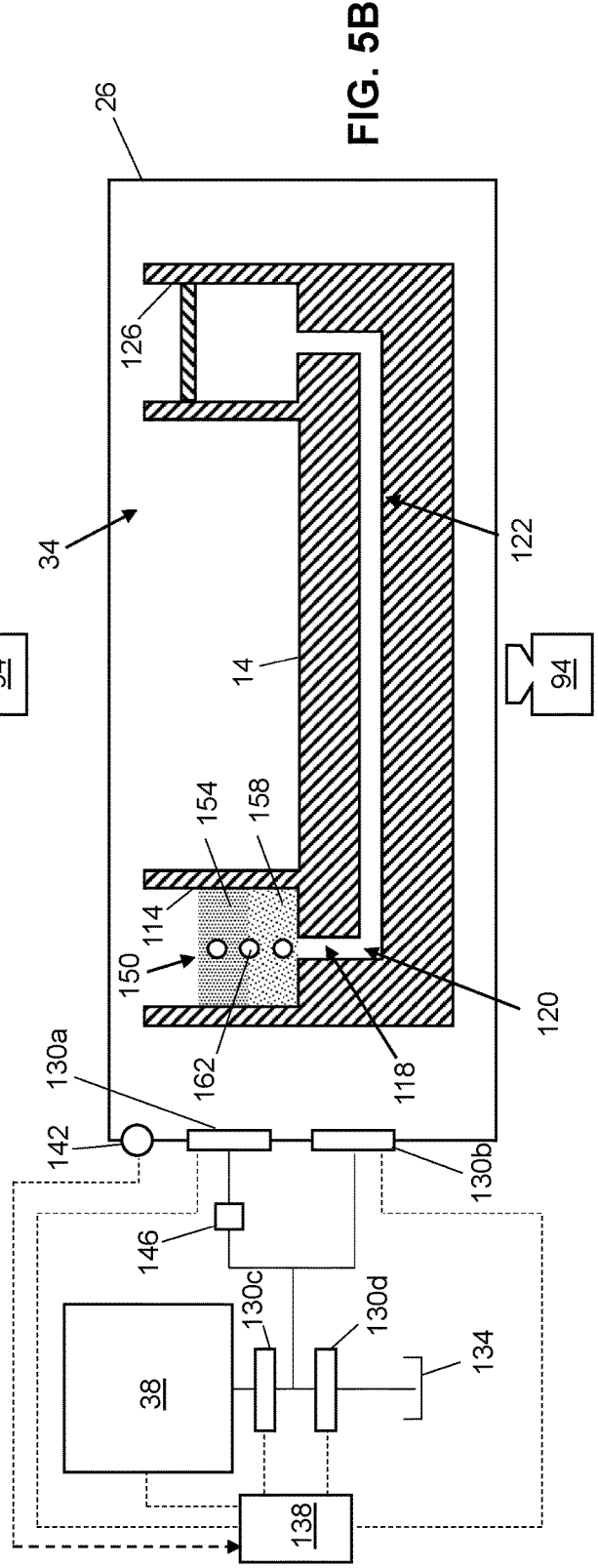

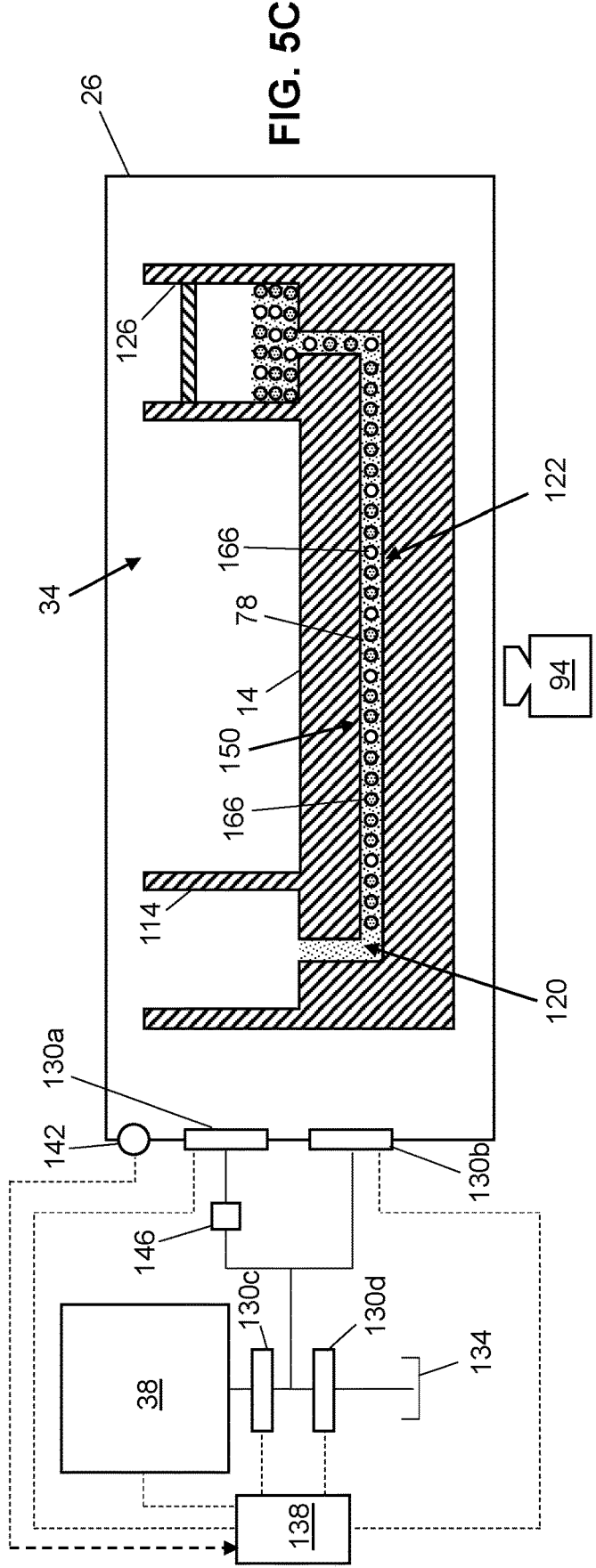

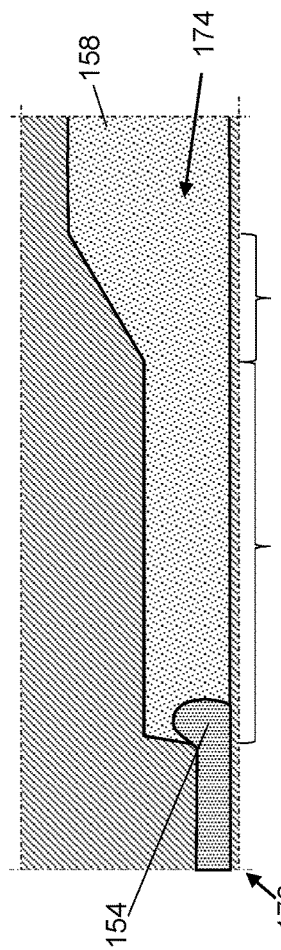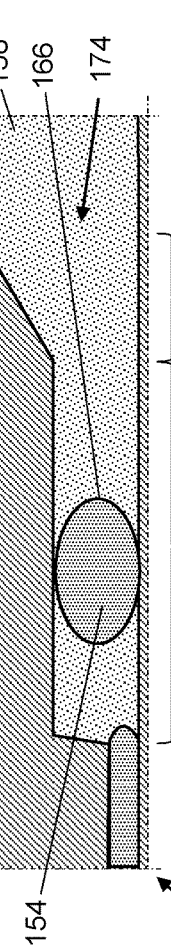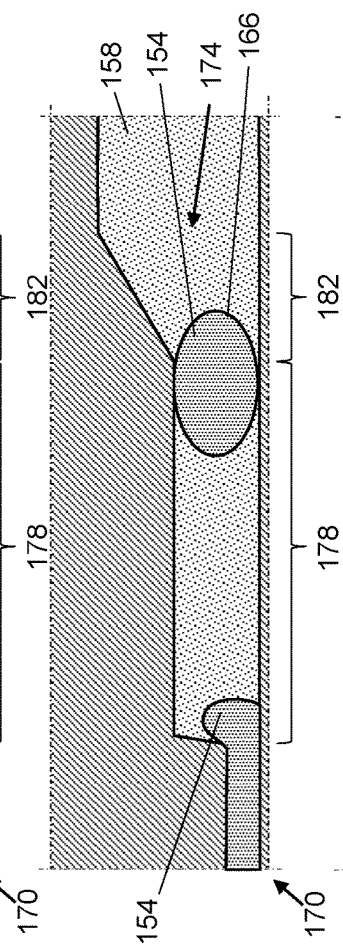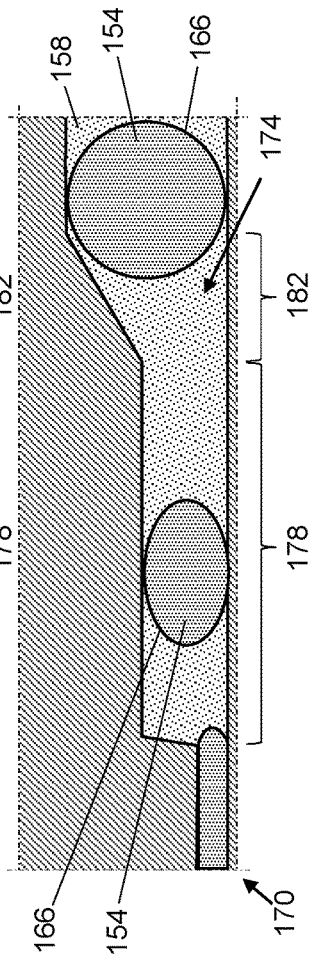

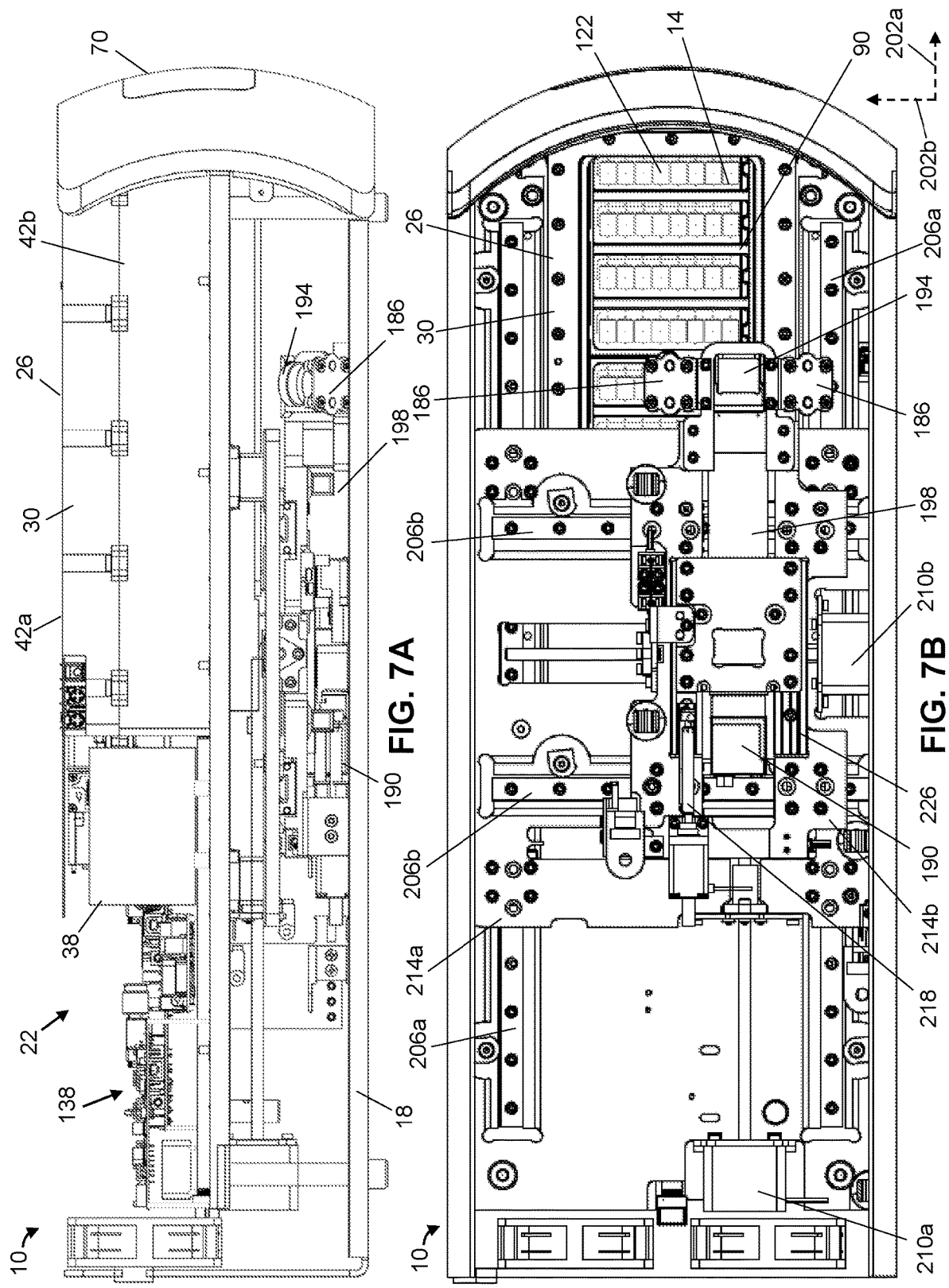

APPARATUSES FOR CONTACTLESS LOADING AND IMAGING OF MICROFLUIDIC CHIPS AND RELATED METHODS

CROSS-REFERENCE TO RELATED APPLICATION

This application claims priority to U.S. patent application Ser. No. 16/858,282, filed Apr. 24, 2020, which is incorporated herein by reference in its entirety.

FIELD OF INVENTION

The present invention relates generally to loading and imaging microfluidic chips and, in particular but without limitation, to vacuum loading microfluidic chips configured to generate droplets and imaging the droplets.

BACKGROUND

Microfluidic chips have gained increased use in a wide variety of fields, including cosmetics, pharmaceuticals, pathology, chemistry, biology, and energy. A microfluidic chip typically has one or more channels that are arranged to transport, mix, and/or separate one or more samples for analysis thereof. At least one of the channel(s) can have a dimension that is on the order of a micrometer or tens of micrometers, permitting analysis of comparatively small (e.g., nanoliter or picoliter) sample volumes. The small sample volumes used in microfluidic chips provide a number of advantages over traditional bench top techniques. For example, more precise biological measurements, including the manipulation and analysis of single cells and/or molecules, may be achievable with a microfluidic chip due to the scale of the chip's components. Microfluidic chips can also provide improved control of the cellular environment therein to facilitate experiments related to cellular growth, aging, antibiotic resistance, and the like. And, microfluidic chips, due to their small sample volumes, low cost, and disposability, are well-suited for diagnostic applications, including identifying pathogens and point-of-care diagnostics.

In some applications, microfluidic chips are configured to generate droplets to facilitate analysis of a sample. Droplets can encapsulate cells or molecules under investigation to, in effect, amplify the concentration thereof and to increase the number of reactions. Droplet-based microfluidic chips may accordingly be well-suited for high throughput applications, such as chemical screening and PCR.

Droplet analysis is often performed using imaging. For example, liquid loaded onto a microfluidic chip often includes a fluorescent compound that, when exposed to light, can exhibit fluorescence. For example, when analyzing microorganisms, a viability indicator such as resazurin can be included in the liquid loaded onto the chip; encapsulated microorganisms can interact with the viability indicator such that droplets including the microorganisms exhibit a unique fluorescent signature that varies over time. A camera can be used to determine the number of droplets exhibiting a fluorescent signature indicative of the presence of microorganisms to, for example, determine the concentration of microorganisms in the liquid (e.g., to determine if there is an infection or how effective a test reagent is at eliminating the microorganisms).

Conventional loading and imaging of a microfluidic chip requires the chip to be transferred for imaging after being loaded with droplets. In conventional techniques, a chip is placed in a pressure vessel and the pressure therein is increased above ambient pressure to cause liquid to flow toward the chip's test volume and form droplets that enter the test volume. During this process, the pressure in the test volume increases above ambient pressure. To maintain the position of droplets in the test volume when the pressure around the chip returns to ambient pressure—which is required for the chip to be transferred for imaging—and the chip is transferred, chips typically include features such as seals configured to retain the droplets.

There are a number of disadvantages associated with this two-step process. The process can be time-consuming; to mitigate the movement of droplets in the test volume, the pressure in the pressure chamber may have to be returned to ambient pressure slowly. Further, transferring the chip for imaging may take time and, if not done quickly enough in time-sensitive assays, may invalidate the results of the assay. Transferring chips is typically performed manually by laboratory staff, which imposes an additional burden on the staff and poses a risk that test results will be associated with the wrong chips. The chip transfer may also damage the chips or result in droplet repositioning that can alter the imaging analysis. And the features included in chips to maintain droplet positioning during transfer may reduce available space in the test volume and increase manufacturing complexity.

SUMMARY

Accordingly, there is a need in the art for apparatuses and methods for loading and imaging a microfluidic chip that can avoid the disadvantages of conventional load-and-transfer techniques. Some of the present apparatuses and methods address this need in the art through the use of an apparatus including a housing having walls that defines a vacuum chamber and an optical sensor coupled to the housing. The apparatus can include one or more receptacles, each defining a space for receiving one or more microfluidic chips, and a negative pressure source coupled to the housing and configured to reduce pressure within the vacuum chamber. The chip(s) can be disposed on the receptacle(s) and in the vacuum chamber, where the pressure can be reduced below ambient pressure to evacuate gas from each of one or more test volumes of each of the chip(s) and subsequently increased to ambient pressure to load liquid—which can form droplets—into the test volume(s). As a result, the pressure in each of the test volume(s) can be substantially ambient pressure after loading such that the chip(s) need not include features to maintain droplet positioning.

The optical sensor can be configured to capture an image of at least a portion of each of the space(s), e.g., to capture on image of liquid in each of the test volume(s) of the chip(s). As such, liquid in the chip(s) can be imaged while the chip(s) are in the vacuum chamber such that they do not need to be transferred after loading. One of the housing's walls can include a transparent portion through which the optical sensor can capture an image—thus permitting the optical sensor to be positioned outside of the vacuum chamber—and the optical sensor can be movable relative to the housing in at least one direction—optionally in at least two orthogonal directions—such that the optical sensor can capture images of liquid in multiple test volumes without having to move the chip(s). In this manner, chip loading and imaging can be performed without having to manually transfer chips, thereby mitigating the risk of droplet repositioning and chip damage.

Some of the present apparatuses for loading and imaging at least one microfluidic chip comprise a housing having walls that define a vacuum chamber and a negative pressure source coupled to the housing and configured to reduce pressure within the vacuum chamber. At least one of the walls, in some apparatuses, defines an opening. For some of such apparatuses, the housing comprises a door that is movable between an open position in which the door permits access to the vacuum chamber through the opening and a closed position in which the door prevents access to the vacuum chamber through the opening. Some apparatuses comprise a seal coupled to the housing such that, when the door is in the closed position, the seal is disposed around the opening and in contact with the door. In some apparatuses, reducing pressure within the vacuum urges the door against the seal.

Some apparatuses comprise a tray that is movable into and out of the vacuum chamber through the opening. The tray, in some apparatuses, is slidably coupled to at least one of the walls of the housing and/or is coupled to the door such that movement of the door between the open and closed positions moves the tray into and out of the vacuum chamber.

Some apparatuses comprise a first receptacle disposed within the vacuum chamber, the first receptacle defining a space for receiving one or more, optionally two or more, microfluidic chips. Some apparatuses also comprise a second receptacle disposed within the vacuum chamber, the second receptacle defining a space for receiving one or more microfluidic chips. The first receptacle, in some apparatuses, is coupled to or defined by the tray. In some apparatuses, while the door is in the closed position, the first receptacle is immovable in at least two orthogonal directions relative to at least one of the walls of the housing.

Some apparatuses comprise a light source coupled to the housing and positionable to illuminate at least a portion of the space for receiving the microfluidic chip(s) and/or an optical sensor coupled to the housing and positionable to capture an image of at least a portion of the space for receiving the microfluidic chip(s). In some apparatuses, at least one of the walls of the housing includes a transparent portion and, optionally, the optical sensor is disposed outside of the vacuum chamber and is positioned to capture an image of at least a portion of the space for receiving the microfluidic chip(s) through the transparent portion. The optical sensor, in some apparatuses, is movable relative to at least one of the walls of the housing in at least two orthogonal directions. Some apparatuses comprise a heating element disposed within the vacuum chamber.

Some of the present methods of loading and imaging a microfluidic chip comprise disposing one or more, optionally two or more, microfluidic chips within a vacuum chamber defined by walls of a housing. Each of the chip(s), in some methods, has one or more, optionally two or more, microfluidic networks. In some methods, each of the network(s) comprises one or more ports, including an inlet port containing liquid, a test volume containing gas, and a flow path extending between the inlet port and the test volume. The flow path, in some methods, includes a droplet-generating region along which a minimum cross-sectional area of the flow path increases along the flow path.

Some methods comprise reducing pressure within the vacuum chamber such that, for each of the network(s) of each of the chip(s), gas flows from the test volume and out of at least one of the port(s). Some methods comprise increasing pressure within the vacuum chamber such that, for each of the network(s) of each of the chip(s), liquid flows from the inlet port, through the flow path, and into the test volume. In some methods, increasing pressure within the vacuum chamber is performed such that pressure within the vacuum chamber reaches ambient pressure. Pressure within the chamber increases from the minimum pressure to ambient pressure, in some methods, in less than 1 hour.

Some methods comprise, for each of the network(s) of each of the chip(s), capturing an image of liquid within the test volume while the chip is disposed within the vacuum chamber. In some methods, for each of the chip(s), the chip remains stationary relative to at least one of the walls of the housing between and during each of increasing pressure within the vacuum chamber and capturing the image. In some methods, for each of the network(s) of each of the chip(s), capturing an image of liquid comprises moving an optical sensor relative to the walls of the housing in at least two orthogonal directions. For each of the network(s) of each of the chip(s), capturing the image, in some methods, is performed within 15 minutes of pressure within the chamber reaching ambient pressure.

In some methods, at least one of the walls includes a transparent portion and, for each of the network(s) of each of the chip(s), capturing the image is performed using an optical sensor disposed outside of the vacuum chamber and through the transparent portion. Some methods comprise, for each of the chip(s), illuminating the chip with a light source coupled to at least one of the walls of the housing while the chip is disposed within the vacuum chamber.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," "include" and any form thereof such as "includes" and "including," and "contain" and any form thereof such as "contains" and "containing," are open-ended linking verbs. As a result, an apparatus that "comprises," "has," "includes," or "contains" one or more elements possesses or contains those one or more elements, but is not limited to possessing or containing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

FIG. 1A is a perspective view of an embodiment of the present apparatuses for loading and imaging one or more microfluidic chips.

FIGS. 1B-1G are front, rear, right, left, top, and bottom views, respectively, of the apparatus of FIG. 1A.

FIG. 1H is a left view of the apparatus of FIG. 1A with a portion of its outer shell removed such that the internal components thereof—including the vacuum-chamber-defining housing and optical sensor—can be seen.

FIG. 1I is a bottom view of the apparatus of FIG. 1A with a portion of its outer shell removed such that the internal components thereof can be seen.

FIGS. 2A and 2B are perspective views of the vacuum-chamber-defining housing of the apparatus of FIG. 1A when the door and tray thereof are in the closed and open positions, respectively.

FIG. 2C is a top view of the housing of FIG. 2A with the door and tray thereof in the open position.

FIGS. 2D and 2E are top and bottom views, respectively, of the housing of FIG. 2A with the door and tray thereof in the open position and a plurality of microfluidic chips disposed on the tray.

FIGS. 2F and 2G are top and bottom views, respectively, of the housing of FIG. 2A with the door and tray thereof in the closed position and a plurality of microfluidic chips disposed on the tray.

FIGS. 2H and 2I are sectional views of the housing of FIG. 2A taken along line 2H-2H of FIG. 2D and line 2I-2I of FIG. 2F, respectively.

FIGS. 5A-5C are schematics of the apparatus of FIG. 1A and illustrate loading of a microfluidic chip using the housing.

FIGS. 6A-6D depict the geometry of a droplet-generating region of a microfluidic chip in which liquid expands along a flow path to produce droplets.

FIGS. 7A and 7B are side and bottom views, respectively, of the apparatus of FIG. 1A with a portion of its outer shell removed such that the internal components thereof can be seen. FIGS. 7A and 7B illustrate the optical sensor shifted relative to the housing in a first direction.

FIG. 7C illustrates the optical sensor shifted relative to the housing in a second direction that is perpendicular to the first direction.

DETAILED DESCRIPTION

Figure 1B:
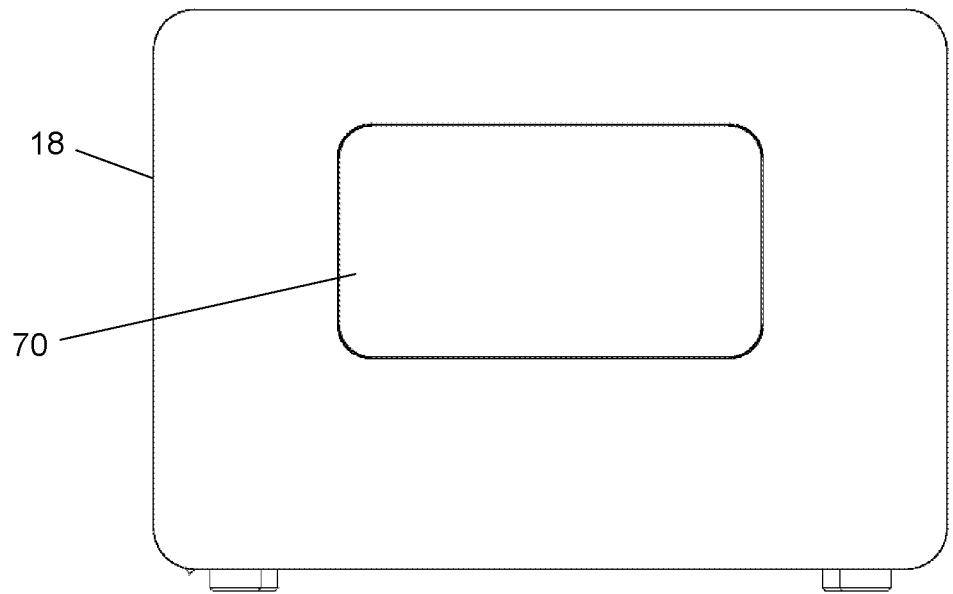
Figure 1C:
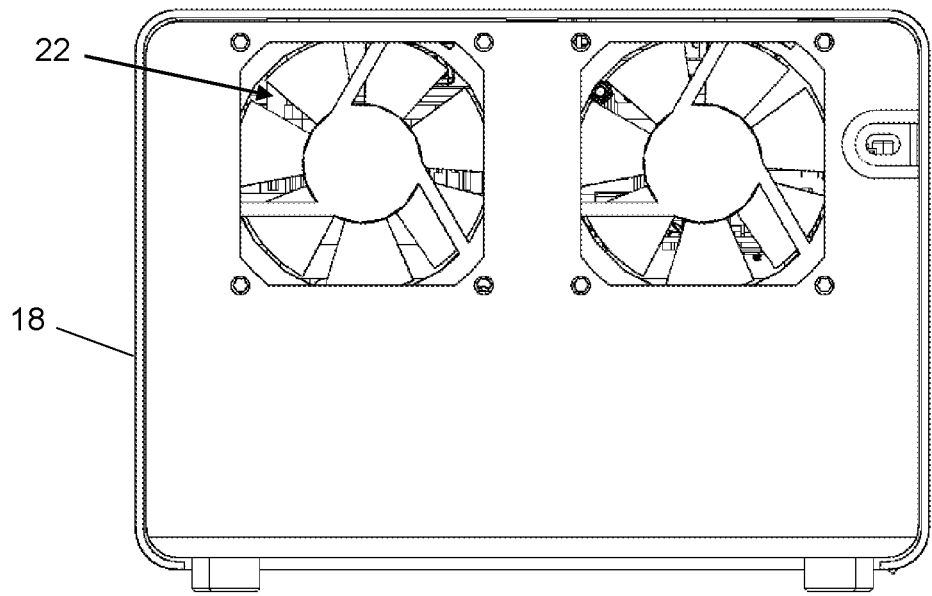
Figure 1F:
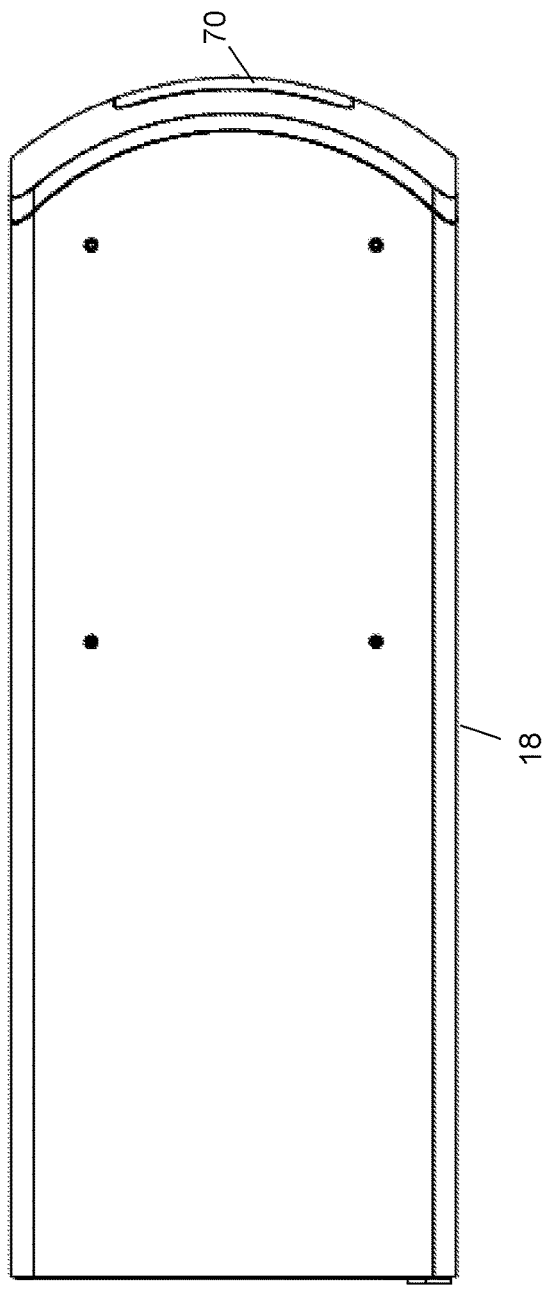
Figure 1G:
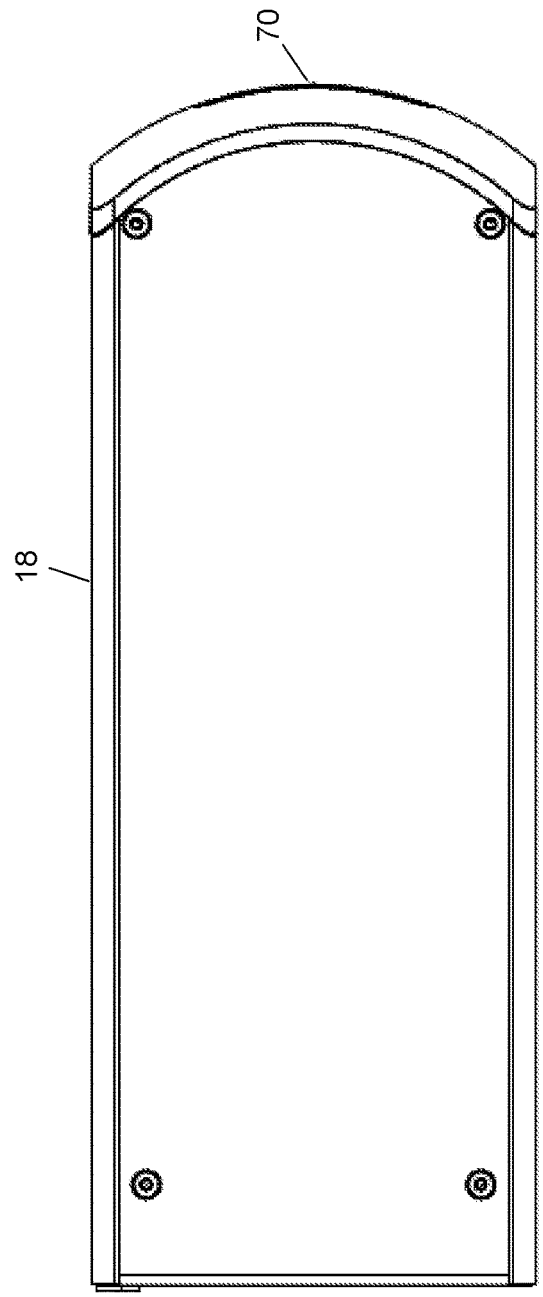

Referring to FIGS. 1A-1I, shown is a first embodiment 10 of the present apparatuses for loading and imaging one or more microfluidic chips (e.g., 14). Apparatus 10 can include an outer shell 18 that defines a compartment 22 containing components of the apparatus that are configured to load the chip(s) with liquid and image the liquid for analysis thereof (FIGS. 1H and 1I). To load the chip(s), apparatus 10 includes a housing 26 having walls 30 that define a vacuum chamber 34 and a negative pressure source 38 (e.g., a pump) configured to remove gas from the vacuum chamber and thereby decrease the pressure therein. As shown, housing 26 includes upper and lower bodies 42a and 42b coupled together with a seal disposed therebetween; such a two-part housing can facilitate the manufacturability thereof.

Referring additionally to FIGS. 2A-2I—which depict housing 26 of apparatus 10—the apparatus can include one or more receptacles 50 that each defines a space 54 for receiving at least one microfluidic chip 14 (FIGS. 2B-2D). For example, apparatus 10 can include a tray 46 that is movable into and out of vacuum chamber 34 and defines or is coupled to receptacle(s) 50. To receive one or more microfluidic chips 14, each of space(s) 54 can comprise a lip 58 onto which the chip(s) can be placed (e.g., when tray 46 is out of vacuum chamber 34). Space 54 can further include an open or transparent portion 62 such that when a chip 14 is disposed on lip 58 at least a majority of the surface of the chip that is disposed on the lip is not obscured by receptacle 50 (e.g., such that one or more test volumes 122 of the chip that receive liquid for imaging are not obscured) (FIG. 2E).

As shown, at least one of walls 30 of housing 26 defines an opening 66 that permits access into vacuum chamber 34. In this way, tray 46 can be moved into and out of vacuum chamber 34 through opening 66 such that chip(s) 14 can be readily placed on and removed from receptacle(s) 50. To seal opening 66 such that negative pressure source 38 can draw a vacuum on vacuum chamber 34, housing 26 can comprise a door 70 that is movable between open (FIGS. 2D and 2E) and closed (FIGS. 2F and 2G) positions in which the door permits and prevents, respectively, access to the vacuum chamber through opening 66. Apparatus 10 can include a seal 74 coupled to housing 26 (e.g., to one of walls 30 or door 70) such that, when the door is in the closed position, the seal is disposed around opening 66 and in contact with the door. Reducing pressure within vacuum chamber 34 can urge door 70 against seal 74, which reinforces the seal. Such self-reinforcing sealing can mitigate leaks, which may be particularly beneficial when analyzing material that may include contaminants such as microorganisms.

Door 70 can be coupled to tray 46 such that movement of the door between the open and closed positions moves the tray into and out of vacuum chamber 34 (e.g., they can move together as a unit). Such a configuration may allow chip(s) 14 to be loaded into vacuum chamber 34 and the vacuum chamber to be sealed at the same time, which promotes usability. In other embodiments, however, door 70 need not be coupled to tray 46 such that movement of the tray is independent of the door (e.g., the door can be movable to uncover opening 66 such that the tray can move therethrough).

Tray 46 can be moved into and out of vacuum chamber 34 in any suitable manner. For example, tray 46 can be slidably coupled to at least one of walls 30 and, optionally, can be moved using one or more actuators 78. Referring to FIGS. 2H and 2I, as shown housing 26 includes a linear actuator 78; in other embodiments, however, the housing can include any suitable actuator. Linear actuator 78 can comprise a leadscrew 82 that is translatable relative to walls 30 to thereby move tray 46. To translate over the distance required for receptacle(s) 50 to be accessible outside of vacuum chamber 34, at least a majority (e.g., substantially all) of leadscrew 82 may need to be disposed outside of the vacuum chamber when tray 46 is disposed in the vacuum chamber (e.g., with door 70 in the closed position). Housing 26 can also include a sealed conduit 86 that extends outside of vacuum chamber 34 and receives leadscrew 82 to mitigate the risk of contaminants escaping the vacuum chamber via the leadscrew. Opening and closing of door 70 can be controlled with a controller 138 of apparatus 10, which may, for example, be configured to actuate actuator 78.

Figure 3A:
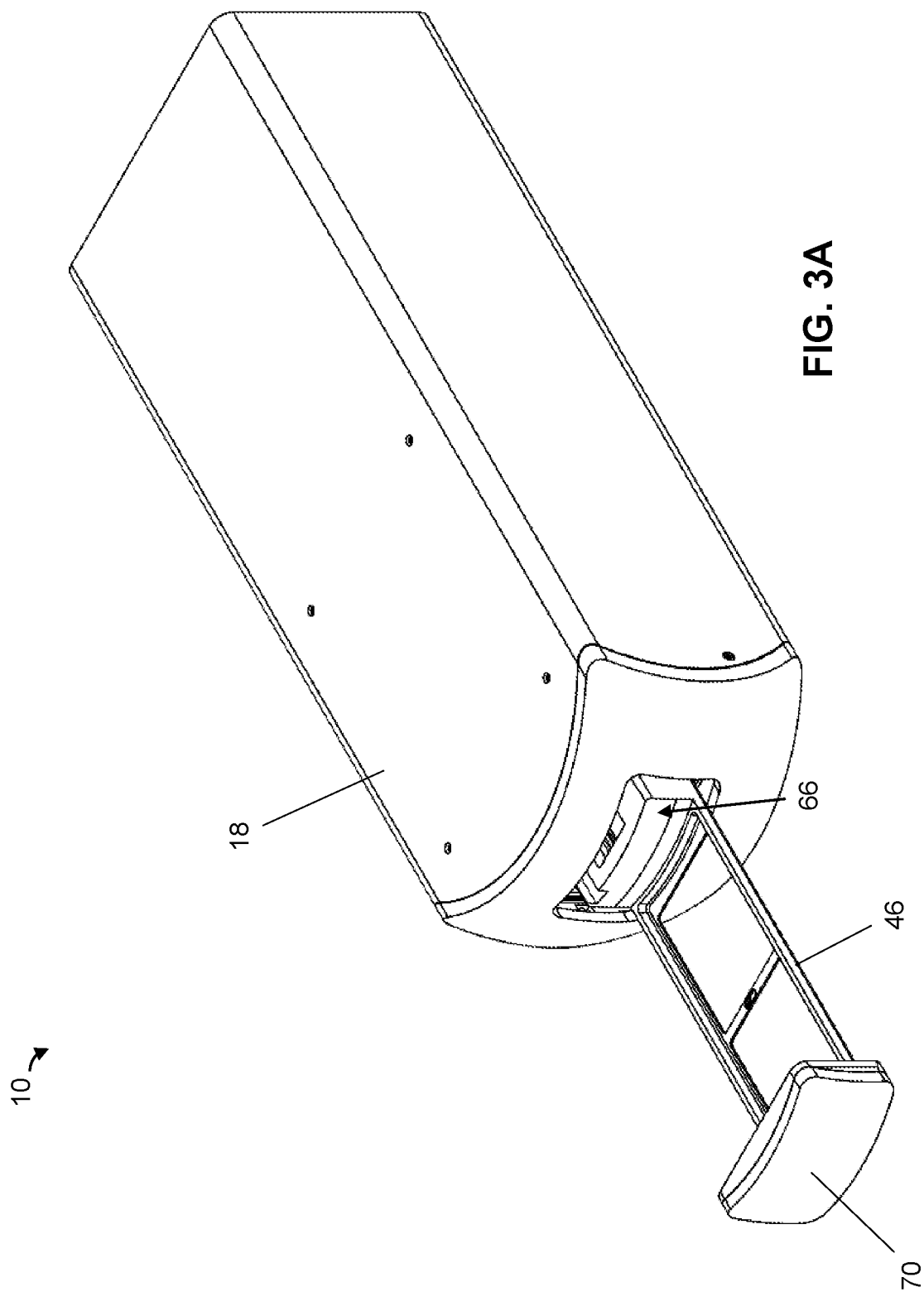
FIGS. 3A and 3B are perspective and top views, respectively, of the apparatus of FIG. 1A with the door and tray of the housing in the open position.
Figure 3B:
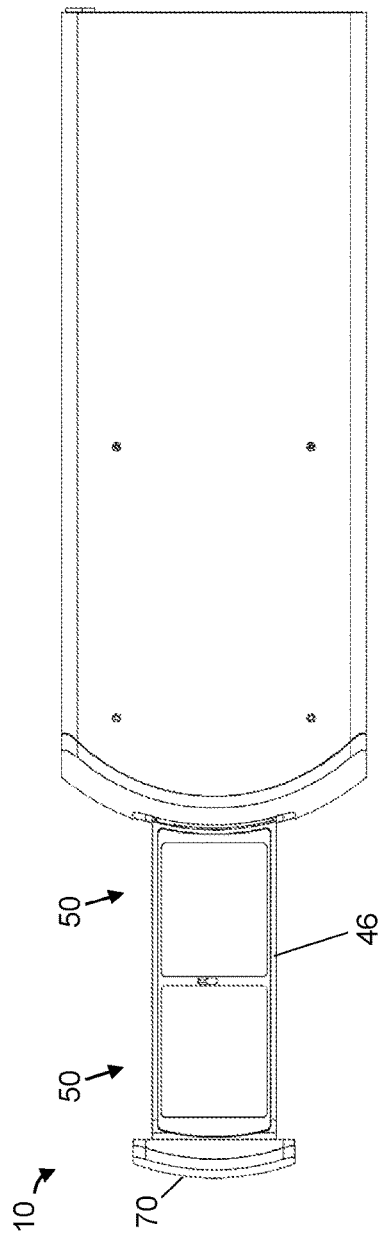
Figure 3C:
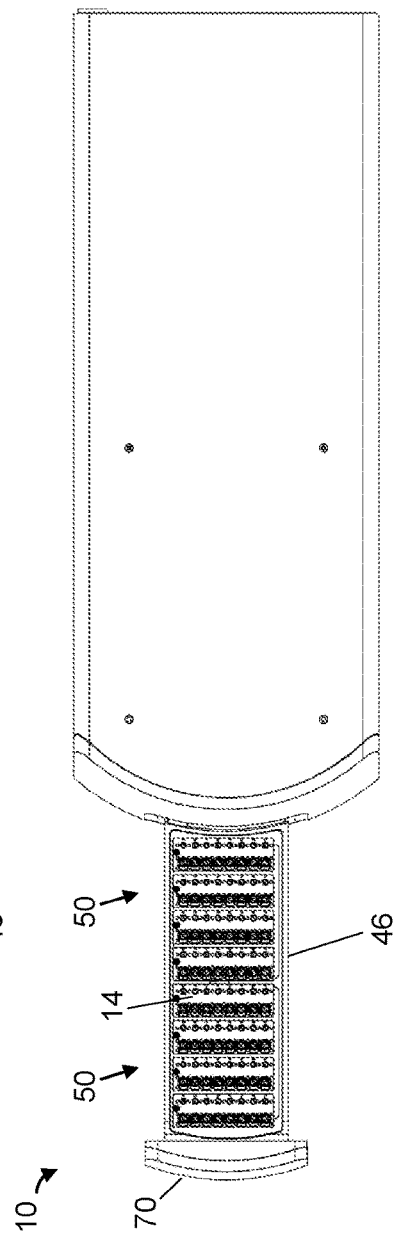
FIG. 3C is a top view of the apparatus of FIG. 1A with the door and tray of the housing in the open position and a plurality of microfluidic chips disposed on the tray.
Figure 3D:
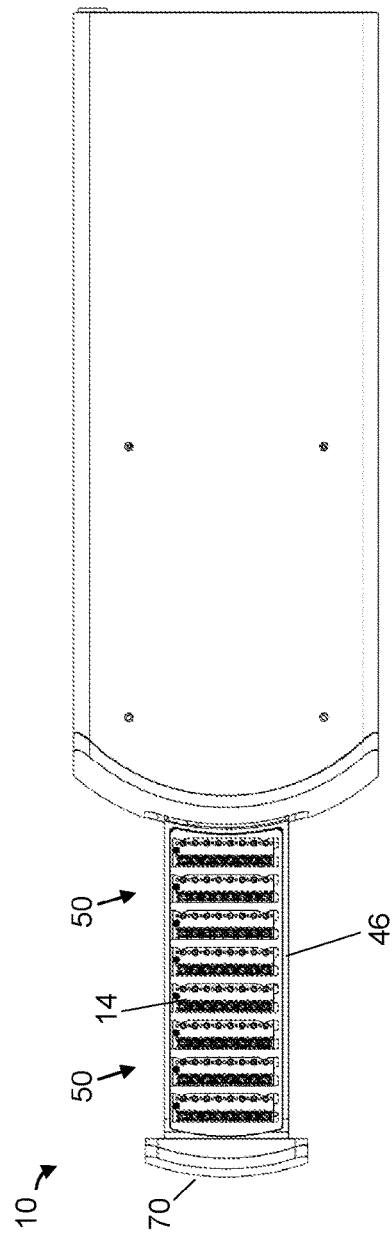
FIG. 3D is a top view of the apparatus of FIG. 1A with the door and tray of the housing in the open position and a retainer disposed on the chips to retain the chips on the tray.

While door 70 is in the closed position, tray 46—and thus each of receptacle(s) 50—can be immovable in at least one direction, optionally in at least two orthogonal directions (e.g., 202a and 202b). In this manner, microfluidic chip(s) 14 that are disposed on receptacle(s) 50 can remain stationary during the below-described imaging thereof. This may promote accurate analysis because moving chip(s) 14 with liquid (e.g., droplets) disposed therein may disturb the liquid and thereby impact the analysis. In other embodiments, however, receptacle(s) 50 may be movable in at least one direct, optionally in at least two orthogonal directions, while door 70 is closed. Apparatus 10 can further include a retainer 106 configured to retain chip(s) 14 on receptacle(s) 50. For example, referring to FIGS. 3A-3D—which depict apparatus 10 when tray 46 and door 70 of housing 26 are in the open position—chip(s) 14 can be placed on receptacle(s) 50 (FIG. 3C) and retainer 106 can thereafter be placed on the chip(s) such that the chip(s) are retained between the receptacle(s) and the retainer.

At least one of walls 30 of housing 26 can include a transparent portion 90 such that at least a portion of each of space(s) 54 can be imaged through the transparent portion. For example, as shown in FIG. 2G, when tray 46 is disposed in vacuum chamber 34, each of one or more test volumes 122—which can contain the liquid to be imaged—of each of chips 14 is visible and thus can be imaged through transparent portion 90. This permits an optical sensor (e.g., 190) to be positioned outside of vacuum chamber 34 such that the optical sensor and its associated electronics (which can be difficult to clean) need not be exposed to contaminants that may be present inside of the vacuum chamber.

Housing 26 can also include an optical scanner 94 that is configured to read and analyze bar codes (e.g., a scanner comprising a light source, a lens, and a light source). Each of chip(s) 14 can include a bar code that represents, for example, patient information. The bar code can be scanned by optical scanner 94 when chip 14 enters vacuum chamber 34 (e.g., as tray 46 slides into the vacuum chamber). Apparatus 10 can link the information associated with the scanned barcode with the imaging analysis.

Inside of vacuum chamber 34, housing 26 can include a heating element 98 that is in thermal communication with receptacle(s) 50 and can be used to control a temperature within the vacuum chamber. For example, when analyzing microorganisms such as bacteria, heating element 98 can be used to maintain a temperature suitable for culturing the microorganisms. Housing 26 can also include a thermally insulating shell 102 in vacuum chamber 34 that defines a compartment that is smaller than the vacuum chamber and contains heating element 98 and receptacle(s) 50 when the receptacles are in the vacuum chamber. The compartment defined by thermally insulating shell 102 can be in fluid communication with the other portion of vacuum chamber 34 such that negative pressure source 38 can reduce pressure in the compartment. By including heating element 98 within the smaller compartment defined by thermally insulating shell 102, the heating element can efficiently control the temperature of the environment to which chip(s) 14 are exposed. Heating element 98 can generate heat through Joule heating (e.g., by passing an electric current through the element to generate heat due to the resistance thereof) and can be fanless, which promotes reliable and safe operation, particularly when analyzing material that may include contaminants such as microorganisms.

Figure 4:
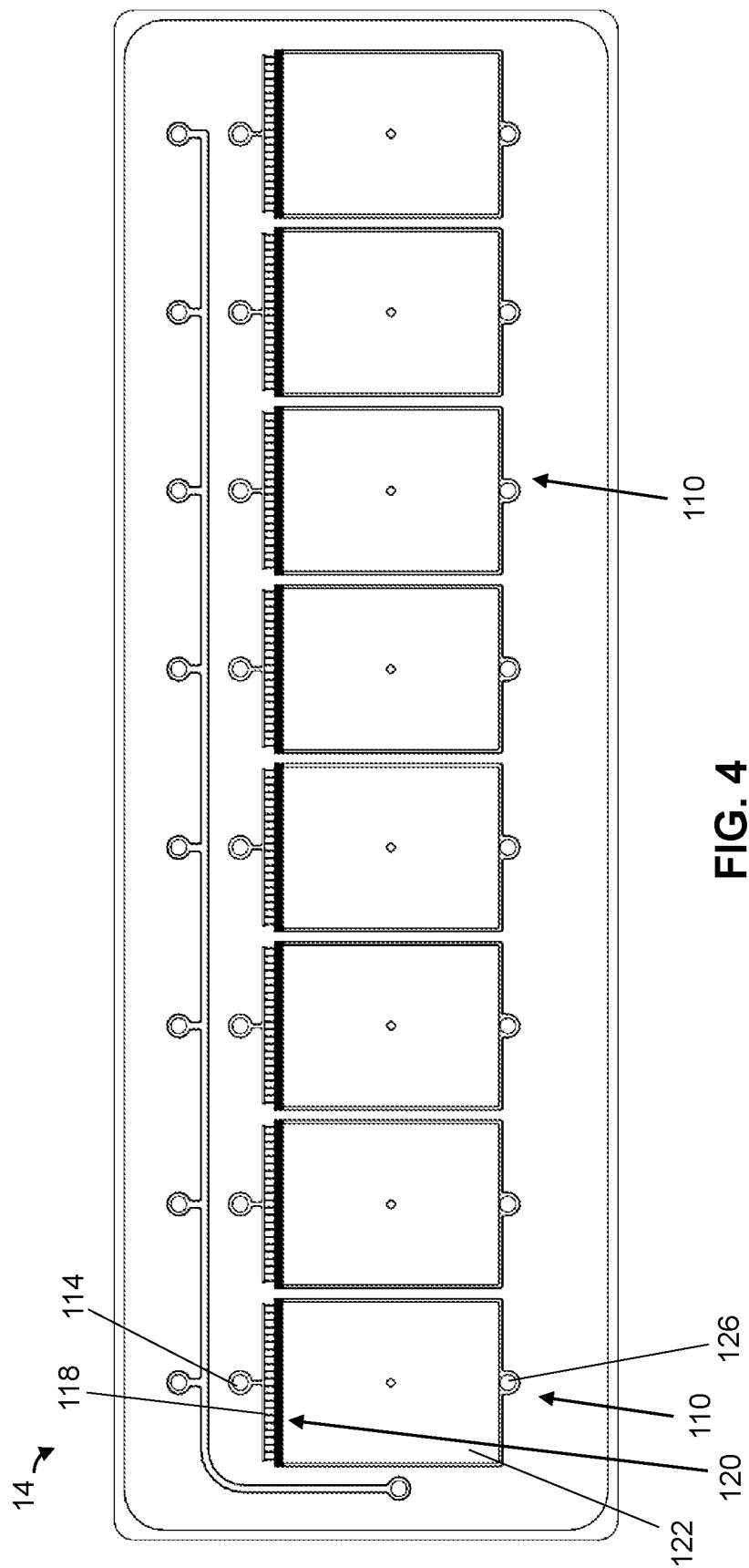
FIG. 4 is a bottom view of a chip that can be loaded and imaged using the apparatus of FIG. 1A.

Referring to FIG. 4, shown is an illustrative chip 14 that can be placed on a receptacle 50 and loaded using apparatus 10. Chip 14 can define one or more—optionally two or more—microfluidic networks 110; as shown, the chip defines multiple networks. Each of network(s) 110 can comprise one or more ports, including an inlet port 114, a test volume 122, and a flow path 118 extending between the inlet port and the test volume. Flow path 118 can include a droplet-generating region 120 and, along the flow path, fluid can flow from inlet port 114, through the droplet-generating region, and to test volume 122 such that droplets are formed and introduced into the test volume for analysis. Flow path 118 can be defined by one or more channels and/or other passageways through which fluid can flow, and can have any suitable maximum transverse dimension to facilitate microfluidic flow, such as, for example, a maximum transverse dimension, taken perpendicularly to the centerline of the flow path, that is less than or equal to any one of, or between any two of, 2,000, 1,500, 1,000, 500, 300, 200, 100, 50, or 25 μm. Each of network(s) 110 optionally includes an outlet port 126 that at least some (e.g., excess) droplets can enter from test volume 122.

Referring to FIGS. 5A-5C, to load liquid into each of the test volume(s) (e.g., 122) of one or more, optionally two or more, microfluidic chips (e.g., 14), some methods include a step of disposing the chip(s) within the vacuum chamber (e.g., 34) defined by walls (e.g., 30) of the housing (e.g., 26) (e.g., using tray 46 as explained above) (FIG. 5A). Each of the chip(s) can have, for each of the microfluidic network(s) (e.g., 110), an inlet port (e.g., 114) containing a liquid (e.g., 150). The liquid can comprise an aqueous liquid (e.g., 154) (e.g., a liquid containing a sample for analysis, such as a pathogen and/or a medication) and a non-aqueous liquid (e.g., 158) (e.g., an oil, such as a fluorinated oil, that can include a surfactant). To promote droplet generation, the non-aqueous liquid can be relatively dense compared to water, e.g., a specific gravity of the non-aqueous liquid can be greater than or equal to any one of, or between any two of, 1.3, 1.4, 1.5, 1.6, or 1.7 (e.g., greater than or equal to 1.5).

Before loading liquid into the test volume(s) of the chip(s), some methods comprise reducing pressure within the vacuum chamber such that, for each of the network(s) of each of the chip(s), gas (e.g., 162) flows from the test volume and out of at least one of the port(s) (e.g., out of the inlet port) of the chip (FIG. 5B). Prior to the pressure reduction, the pressure in the vacuum chamber (and thus at the inlet port and, optionally, in the test volume) can be substantially ambient pressure; to evacuate gas from the test volume of each of the network(s), the pressure in the vacuum chamber (and thus at the inlet port) can be reduced below ambient pressure. For example, reducing pressure can be performed such that the pressure in the vacuum chamber is less than or equal to any one of, or between any two of, 0.5, 0.4, 0.3, 0.2, 0.1, or 0 atm. Greater pressure reductions can increase the amount of gas evacuated from each of the test volume(s). During gas evacuation, the outlet port (e.g., 126) of each of the network(s) can be sealed (e.g., with a plug, valve, and/or the like) to prevent the inflow of gas therethrough; in other embodiments, however, the network (s) can have no outlet ports. As shown, the gas can flow out of the inlet port while the liquid is disposed in the inlet port such that the gas passes through the liquid as bubbles. Advantageously, the gas bubbles can agitate and thereby mix the aqueous liquid to facilitate loading and/or analysis thereof in the test volume.

Pressure can thereafter be increased within the vacuum chamber, optionally such that pressure within the vacuum chamber—and thus at the inlet port of each of the network(s) of each of the chip(s)—reaches ambient pressure. As a result, for each of the network(s) of each of the chip(s), the liquid can flow from the inlet port, through the flow path, and into the test volume (FIG. 5C). The liquid can form droplets (e.g., 166) when passing through the droplet-generating region (e.g., 120), which can enter the test volume; as liquid is introduced into the test volume, the pressure within the test volume can increase until it reaches substantially ambient pressure as well.

Loading the chip(s) using a negative pressure gradient—which results from the pressure in the test volume being lower than that in the vacuum chamber during loading—provides a number of benefits. In conventional loading techniques that use a positive pressure gradient, the test volume can be pressurized to above ambient pressure when loaded with droplets; as such, droplets loaded in that manner may tend to shift and evacuate from the chip when the environment around the chip returns to ambient pressure. To mitigate that evacuation, conventionally-loaded chips may need seals or other retention mechanisms to keep the droplets in the test volume and the pressure in the external environment may need to be returned to ambient pressure slowly. By achieving pressure equalization between the test volume and the environment outside of the chip (e.g., to ambient pressure) using the negative pressure gradient, the position of the droplets within the test volume can be maintained for analysis without the need for additional seals or other retention mechanisms, and pressure equalization can be performed faster. For example, pressure within the vacuum chamber can increase from the minimum pressure to ambient pressure in less than or equal to any one of, or between any two of, 1 hour, 50 minutes, 40 minutes, 30 minutes, 20 minutes, 10 minutes, 5 minutes, or 30 seconds. Additionally, the negative pressure gradient used to load the chip can reinforce seals (e.g., between different pieces of the chip) to prevent chip delamination and can contain unintentional leaks by drawing gas into a leak if there is a failure. Leak containment can promote safety when, for example, the aqueous liquid includes pathogens. Optionally, pressure in the chamber can be decreased again (e.g., such that pressure in the chamber is less than or equal to any one of, or between any two of, 0.9, 0.8, 0.7, 0.6, 0.5, 0.4, 0.3, 0.2, 0.1, or 0 atm) during the below-described imaging, which may further facilitate maintenance of the droplet positions.

The pressure in the vacuum chamber can be reduced and increased using the negative pressure source (e.g., 38) and/or one or more control valves (e.g., 130a-130d). For example, the negative pressure source can remove gas from the vacuum chamber and thereby decrease pressure therein (e.g., to below ambient pressure). Each of the control valve(s) can be movable between closed and open positions in which the control valve prevents and permits, respectively, fluid transfer between the vacuum chamber, the negative pressure source, and/or and the external environment (e.g., 134 (e.g., compartment 22)). For example, the control valve(s) of apparatus 10 can comprise a vacuum valve 130c and a vent valve 130d. During gas evacuation, vacuum valve 130c can be opened and vent valve 130d can be closed such that negative pressure source 38 can draw gas from vacuum chamber 34 and the vacuum chamber is isolated from the external environment. During liquid introduction, vacuum valve 130c can be closed and vent valve 130d can be opened such that gas (e.g., air) can flow from the external environment into vacuum chamber 34.

Controller 138 of apparatus 10 can be configured to control negative pressure source 38 and/or the control valve (s) to regulate pressure in vacuum chamber 34. Controller 138 can be configured to receive vacuum chamber pressure measurements from a pressure sensor 142. Based at least in part on those pressure measurements, controller 138 can be configured to activate negative pressure source 38 and/or at least one of the control valve(s), e.g., to achieve a target pressure within vacuum chamber 34 (e.g., with a proportional-integral-derivative controller). For example, to control the rate at which pressure changes, the control valve(s) of apparatus 10 can comprise a slow valve 130a and a fast valve 130b, each—when in the open position—permitting fluid flow between vacuum chamber 34 and at least one of negative pressure source 38 and external environment 134. Apparatus 10 can be configured such that the maximum rate at which gas can flow through slow valve 130a is lower than that at which gas can flow through fast valve 130b. As shown, for example, apparatus 10 comprises a restriction 146 in fluid communication with slow valve 130a. Controller 138 can control the rate at which gas enters or exits vacuum chamber 34—and thus the rate of change of pressure in the vacuum chamber—at least by selecting and opening at least one of slow valve 130a (e.g., for a low flow rate) and fast valve 130b (e.g., for a high flow rate) and closing the non-selected valve(s), if any. Slow and fast valves 130a and 130b can be in fluid communication with both vacuum valve 130c and vent valve 130d such that controller 138 can adjust the flow rate in or out of vacuum chamber 34 with the slow and fast valves during both stages. As such, suitable control can be achieved without the need for a variable-powered negative pressure source or proportional valves, although, in some embodiments, negative pressure source 38 can provide different levels of vacuum power and/or at least one of control valves 130a-130d can comprise a proportional valve.

As shown, apparatus 10 can be used to load multiple (e.g., two or more) microfluidic networks—whether defined by the same chip or by different chips—at the same time. For example, the one or more chips can comprise two or more chips and/or the one or more microfluidic networks of each of the chip(s) can comprise two or more microfluidic networks. Because the ports of the microfluidic networks (whether defined by the same chip or different chips) are exposed to the pressure changes in the vacuum chamber at substantially the same time, when pressure increases in the chamber, the liquids in the inlet ports can all be directed to the test volume of their respective microfluidic network. For example, as shown, the apparatus can receive eight chips, each defining eight microfluidic networks such that sixty four test volumes can be loaded at the same time, allowing for the rapid analysis of multiple samples. This increases throughput.

Further, because pressure at the port(s) is controlled at least via the vacuum chamber pressure, the port(s) need not be contacted after the chip(s) are disposed within the vacuum chamber and their microfluidic network(s) are placed in fluid communication with the vacuum chamber at least until images of the liquid are captured as described below. To illustrate, each of the port(s) can be sealed prior to being disposed within the vacuum chamber (e.g., to contain liquid therein) and placed in fluid communication with the vacuum chamber by breaking the seal (e.g., such that chamber pressure can be communicated to the port), optionally with a piercer in the vacuum chamber; after the seal is broken, the port need not be contacted at least until imaging is complete.

Droplet generation can be achieved in any suitable manner. For example, referring to FIGS. 6A-6D, in droplet-generating region 120 a minimum cross-sectional area of flow path 118 can increase along the flow path. To illustrate, flow path 118 can include a constricting section 170 and an expansion region 174, where a minimum cross-sectional area of the flow path is larger in the expansion region than in the constricting section. Such a change in the cross-sectional area of flow path 118 can result from variations in the depth of the flow path. For example, flow path 118 can include a constant section 178 (e.g., along which the depth of the flow path is substantially the same) and/or an expanding section 182 (e.g., along which the depth of the flow path increases along the flow path), the maximum depth of each being larger than the maximum depth of constricting section 170. As such, the liquid flowing along flow path 118 from constricting section 170 to expansion region 174 can expand to form droplets 166 (e.g., when the liquid includes aqueous liquid in the presence of the non-aqueous liquid) (FIGS. 6A and 6B).

When expansion region 174 includes constant section 178 and an expanding section 182, the constant section can compress droplets 166 to prevent full expansion thereof (FIG. 6B). Constant section 178 can thereby prevent droplets 166 from stacking on one another such that the droplets can be arranged in a two-dimensional array in test volume 122. Such an array can facilitate accurate analysis of droplets 166. A compressed droplet 166 flowing from constant section 178 to expanding section 182 can travel and decompress along a ramp (whether defined by a single surface, as shown, or by a plurality of steps) of the expanding section (FIGS. 6C and 6D). The decompression can lower the surface energy of droplet 166 such that the droplet is propelled along the ramp and out of expanding section 182 (e.g., toward test volume 122). At least by propelling droplets 166 out of expanding section 182, the ramp can mitigate droplet accumulation at the interface between the outlet of constricting section 170 and constant section 174 such that droplets 166 do not obstruct subsequent droplet formation. Because such obstruction can cause inconsistencies in droplet size, expanding section 182—by mitigating blockage—can facilitate formation of consistently-sized droplets, e.g., droplets that each have a diameter within 3-6% of the diameter of each other of the droplets.

Droplet-generating region 120 can have other configurations to form droplets. For example, expansion of liquid can be achieved with a constant section 178 alone, an expanding section 182 alone, or an expanding section upstream of a constant section. And in other embodiments droplet-generating region 120 can be configured to form droplets via a T-junction (e.g., at which two channels—aqueous liquid 155 flowing through one and non-aqueous liquid 158 flowing through the other—connect such that the non-aqueous liquid shears the aqueous liquid to form droplets), flow focusing, co-flow, and/or the like. In some of such alternative embodiments, each of microfluidic network(s) 110 can include multiple inlet ports 114 and aqueous and non-aqueous liquids 154 and 158 can be disposed in different inlet ports (e.g., such that they can meet at a junction for droplet generation).

Due at least in part to the geometry of droplet-generating region 120, droplets 166 can have a relatively low volume, such as, for example, a volume that is less than or equal to any one of, or between any two of, 10,000, 5,000, 1,000, 500, 400, 300, 200, 100, 75, or 25 picoliters (pL) (e.g., between 25 and 500 pL). The relatively low volume of droplets 166 can facilitate analysis of, for example, microorganisms contained by aqueous liquid 154. During droplet generation, each of one or more of the microorganisms can be encapsulated by one of droplets 166 (e.g., such that each of the encapsulating droplets includes a single microorganism and, optionally, progeny thereof). The concentration of encapsulated microorganism(s) in the droplets can be relatively high due to the small droplet volume, which may permit detection thereof without the need for a lengthy culture to propagate the microorganisms(s). Droplet-generation can be performed to generate—and test volume 122 can have a sufficient volume to receive—sufficient droplets for the below-described analysis. For example, greater than or equal to any one of, or between any two of, 1,000, 5,000, 10,000, 20,000, 30,000, 40,000, 50,000, 60,000, 70,000, 80,000, 90,000, or 100,000 droplets (e.g., between 13,000 and 25,000 droplets) can be formed and accommodated in test volume 122.

Once chip(s) 14 are each loaded with liquid, some methods comprise, for each of the network(s) of each of the chip(s), capturing an image of the liquid (e.g., droplets) within the test volume while the chip is disposed within the vacuum chamber (FIG. 5C and FIGS. 7A-7C). To do this, apparatus 10 can include one or more, optionally two or more, light sources 186 positionable to illuminate at least a portion of each of space(s) 54 for receiving chip(s) 14 and an optical sensor 190 positionable to capture an image of at least a portion of each of the space(s) for receiving the chip(s). In this manner, when chip(s) 14 are disposed on receptacle(s) 50, light source(s) 186 can be configured to illuminate and optical sensor 190 (e.g., a camera, such as a CMOS camera) can be configured to capture an image of droplets 166 in each of test volume(s) 122 (e.g., through transparent portion 90 of housing 26). The liquid loaded into each of test volume(s) 122 can include a fluorescent compound, such as a viability indicator (e.g., resazurin) that can have a particular fluorescence that varies over time (e.g., depending on the interaction of the viability indicator with microorganism(s) from the aqueous liquid that may be encapsulated within droplets 166 during droplet formation). Light source(s) 186 may permit droplets 166 to exhibit and optical sensor 190 can be configured to measure such fluorescence.

For example, each of light source(s) 186 can, but need not, emit green light, such as light having a spectrum in which the peak wavelength (e.g., the wavelength at which the spectrum reaches its highest intensity) is greater than or equal to any one of, or between any two of, 515, 520, 525, 530, 535, 540, or 545 nm (e.g., between 515 and 545 nm) and/or at least 90% of the emitted light has a wavelength that is between 450 and 600 nm. Apparatus 10 can also include, for each of light source(s) 186, a filter through which light emitted from the light source can pass before illuminating a test volume 122 such that certain wavelengths are filtered out, which facilitates the analysis thereof. For example, such a filter can be a long-pass filter that is transmissive over a spectrum spanning between a threshold wavelength and 900 nm and is not transmissive over a spectrum spanning between 300 nm and a wavelength that is less than the threshold wavelength. The threshold wavelength can be greater than or equal to any one of, or between any two of, 570, 575, 580, 585, or 590 nm (e.g., between 575 and 595 nm). Apparatus 10 can further include one or more interference filters through which light attributable to fluorescence of liquid in a test volume 122 can pass to reach optical sensor 190 and that can filter out (e.g., reflect) other light such that it does not reach the optical sensor. Such a filter can be transmissive over a spectrum spanning between lower and upper threshold wavelengths and not transmissive over other spectral ranges, such as between 300 nm and a wavelength that is less than the lower threshold wavelength and between a wavelength that is greater than the upper threshold wavelength and 900 nm. The lower threshold wavelength can be less than or equal to any one of, or between any two of, 515, 510, 505, 500, or 495 nm (e.g., between 490 and 510 nm) and the upper threshold wavelength can be can be greater than or equal to any one of, or between any two of, 525, 530, 535, 540, 545, or 550 nm (e.g., between 530 and 550 nm). As such, substantially all of the light received by optical sensor 190 can be attributable to the liquid's fluorescence to facilitate accurate analysis. For any filter, the filter's transmittance can be greater than or equal to any one of, or between any two of, 85%, 87%, 89%, 91%, 93%, or 95% over a spectrum in which it is transmissive and less than or equal to any one of, or between any two of, 6%, 4%, 2%, or 0% over a spectrum in which it is not transmissive.

Light source(s) 186 and optical sensor 190 can be coupled to housing 26, such as via shell 18. Referring to FIGS. 1H and 1I and 7A-7C, as shown light source(s) 186 and optical sensor 190 are disposed outside of vacuum chamber 34; in other embodiments, however, at least one of the light source(s) and optical sensor can be disposed in the vacuum chamber. To achieve a smaller form factor while providing an adequate optical path for optical sensor 190 to capture the images, apparatus 10 can include a mirror assembly 194 and a tube 198 configured such that the optical sensor can capture an image of each of space(s) 54—and thus the liquid in each of test volume(s) 122—without facing the space. For example, tube 198 can extend in first direction 202a between first and second ends, with optical sensor 190 disposed at the first end and mirror assembly 194 disposed at the second end; the mirror assembly can be configured to receive light in a direction angularly disposed (e.g., substantially perpendicular) relative to the first direction and transmit the light through the tube and to the optical sensor. In this manner, optical sensor 190 can capture images of a space 54—and thus liquid in a test volume 122—when mirror assembly 194 underlies the space.

Figure 7C:
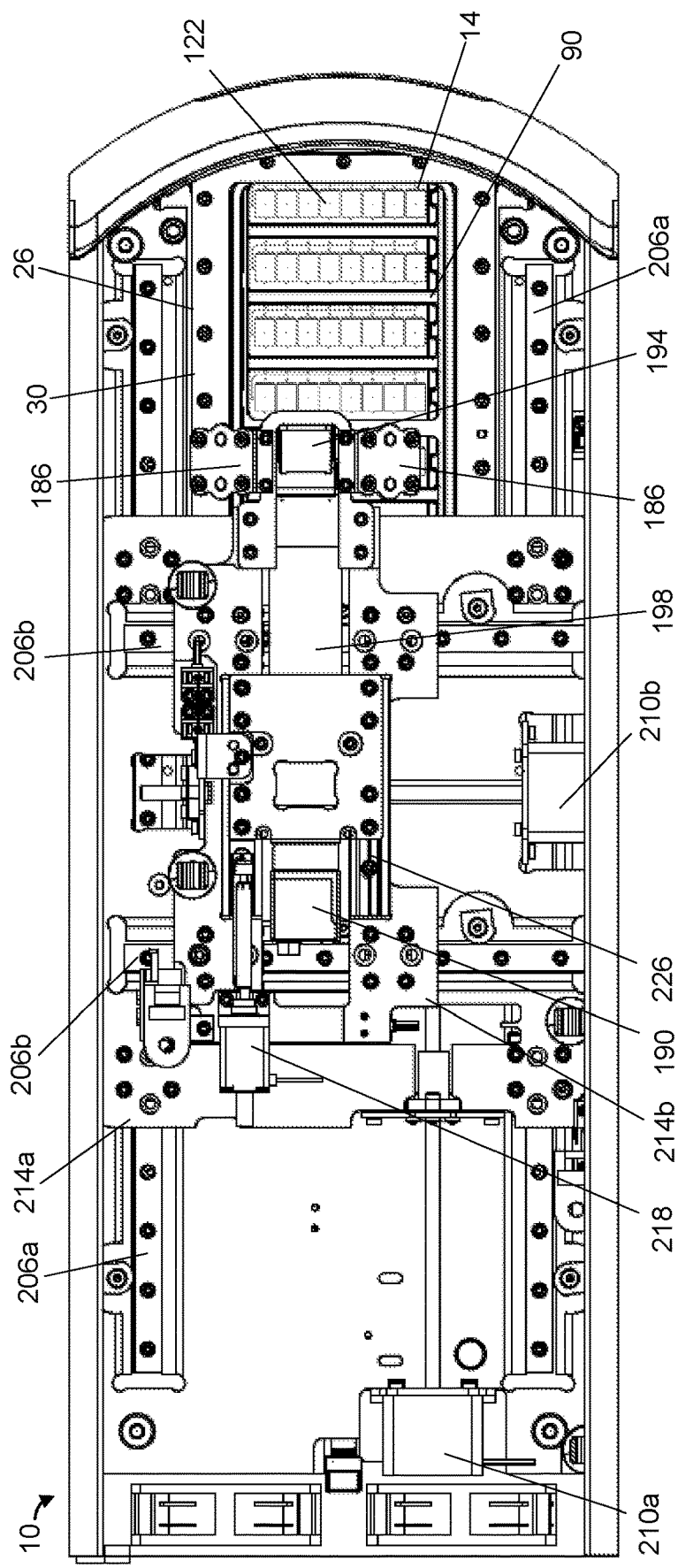
FIG. 7C is a bottom view of the apparatus of FIG. 1A with a portion of its outer shell removed such that the internal components thereof can be seen.

Optical sensor 190 and/or light source(s) 186 can be coupled to housing 26 such that they are movable relative to at least one of walls 30 of housing 26 in at least one direction, optionally in at least two orthogonal directions, to image liquid in each of test volume(s) 122. For example, optical sensor 190 can be moved in first direction 202a (FIGS. 1H-1I and 7A-7B) and in a second direction 202b that is perpendicular to the first direction (FIG. 7C). Light source(s) 186 can be fixed relative to optical sensor 190 and thus can move in the same manner. As such, a single optical sensor 190 can be configured to capture images of multiple test volumes 122 while chip(s) 14 are disposed in vacuum chamber 34 and without moving the chip(s) (e.g., by positioning mirror assembly 194 under the test volumes). Each of chip(s) 14 can thus remain stationary between and during each of increasing pressure within vacuum chamber 34 and capturing the image to mitigate movement of droplets. In other embodiments, however, chip(s) 14 can be moved in at least one direction, optionally with optical sensor 190 moving in at least one direction—which may be perpendicular to the direction in which the chip(s) move—as well to permit imaging of multiple test volumes.

Optical sensor 190 can be moved in any suitable manner, such as with one or more actuators 210a and 210b. As shown, apparatus 10 includes one or more, optionally two or more, first rails 206a along which optical sensor 190 can slide in first direction 202a and one or more, optionally two or more, second rails 206b along which optical sensor 190 can slide in second direction 202b. For example, optical sensor 190—along with light source(s) 186, mirror assembly 194, and tube 198—can be coupled to first and second bases 214a and 214b, the first base slidably mounted on first rail(s) 206a such that the first base can slide in first direction 202a relative to walls 30 of housing 26 and the second base slidably mounted on second rail(s) 206b such that the second base can slide in second direction 202b relative to the walls of the housing. A first actuator 210a can be configured to slide first base 214a in first direction 202a and a second actuator 210b can be configured to slide second base 214b in second direction 202b. In this manner, each of actuators 210a and 210b can independently move optical sensor 190 in a respective one of first and second directions 202a and 202b.

Apparatus 10 can be configured to focus optical sensor 190, such as by moving mirror assembly 194 and/or tube 198 relative to the optical sensor along first direction 202a. To do so, apparatus 10 can include an actuator 218, such as a linear actuator, that is coupled to first and second bases 214a and 214b. For example, mirror assembly 194 and tube 198 can be fixed to a tube mount 222 that is configured to slide relative to optical sensor 190 along first direction 202a on one or more, optionally two or more, rails 226. A spring can be configured to urge tube mount 222—and thus mirror assembly 194 and tube 198—toward optical sensor 190 and actuator 218 can be configured to extend and engage the tube mount to move the tube mount away from the optical sensor. When actuator 218 retracts (e.g., as shown), the force of the spring can move mirror assembly 194 and tube 198 toward optical sensor 190. In other embodiments, however, any suitable mechanism can be used to focus optical sensor 190.

Movement of optical sensor 190, mirror assembly 194, and/or tube 198 (e.g., with actuators 210a and 210b) and/or focusing of the optical sensor (e.g., with actuator 218) can be controlled by controller 138. This can be automated. For example, controller 138 can be configured to receive a command to image chip(s) 14 and thereafter position optical sensor 190 to image each of test volume(s) 122 (e.g., by controlling actuators 210a and 210b as described above).

Because the pressure in test volume 122 of each of network(s) 110 of each of chip(s) 14 can be substantially ambient pressure after loading is complete and imaging can be performed when the chip(s) are in vacuum chamber 34 (e.g., with light source(s) 186 and optical sensor 190 integrated into the same apparatus as the vacuum chamber), images can be captured relatively quickly. For example, for each of the network(s) of each of the chip(s), capturing the image can be performed within 20 minutes, 15 minutes, 10 minutes, or 5 minutes (e.g., within 10 minutes) of pressure within the vacuum chamber reaching the increased ambient pressure from venting (e.g., ambient pressure). Once imaging begins, the imaging can span less than or equal to any one of, or between any two of, 10, 9, 8, 7, 6, 5, 4, 3, 2, or 1 hours.

Figure 8:
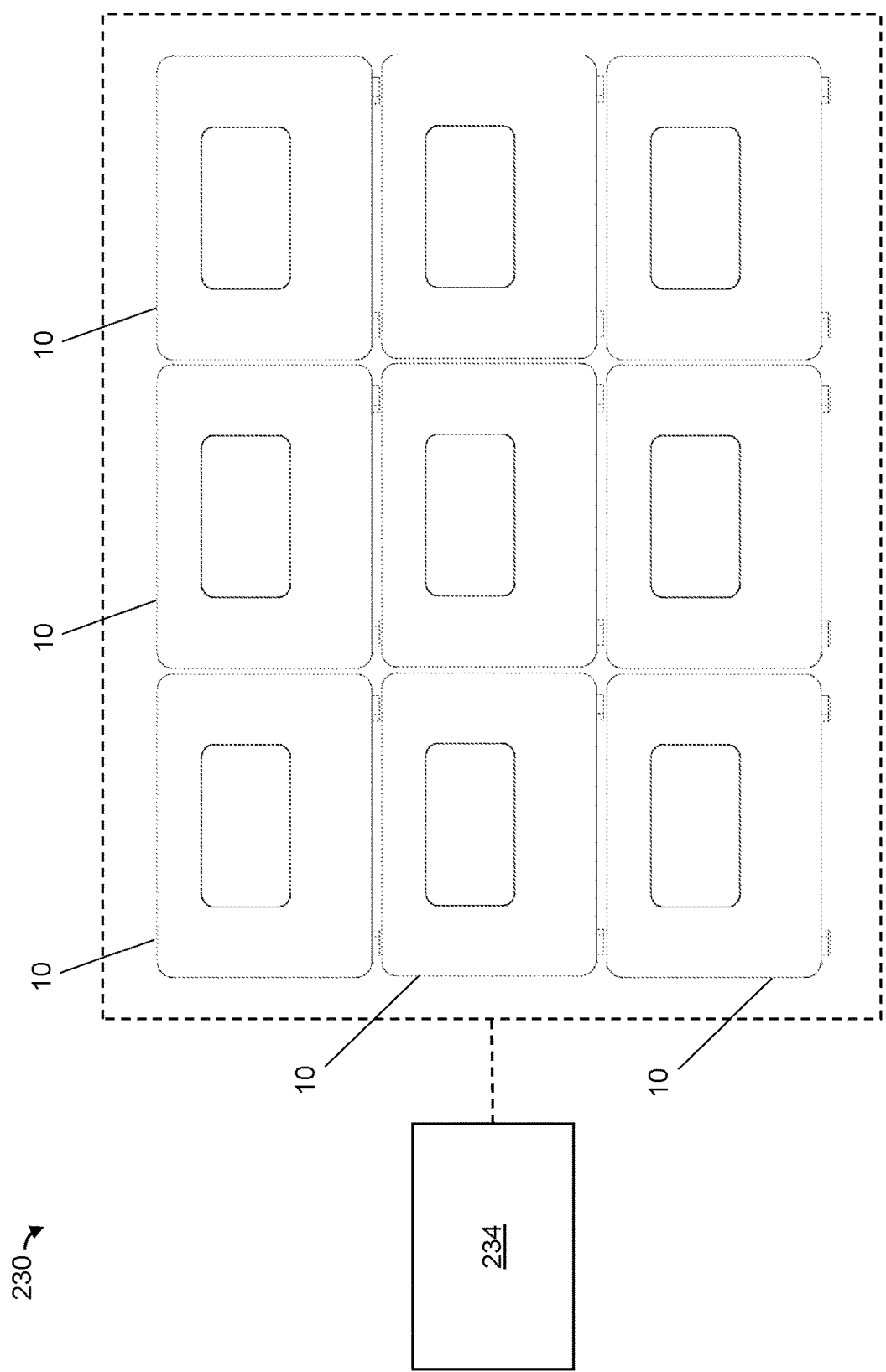
FIG. 8 is a front view of a system including a plurality of apparatuses of FIG. 1A.

Referring to FIG. 8, in some embodiments a system 230 can include multiple ones of apparatus 10 (e.g., any of those described above). As shown, system 230 can include one or more, optionally two or more, stacks of apparatuses 10, each of the stacks including at least two of the apparatuses. Apparatuses 10 can be controlled with a single user interface 234, which may include a screen (e.g., a touch screen), keyboard, mouse, and/or the like through which a user can control each of the apparatuses to open and close door 70 (e.g., by actuating actuator 78), load liquid into chip(s) 14 in vacuum chamber 34 (e.g., by controlling negative pressure source 38), image test volume(s) 122 of chip(s) 14 with optical sensor 190 (e.g., by initiating movement of the optical sensor as described above), and/or the like. User interface 234 can control each of apparatuses 10 independent of the other apparatuses. In this manner, system 230 can promote high-throughput analysis.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An apparatus for loading and imaging at least one microfluidic chip, the apparatus comprising:
   a housing having walls that define a vacuum chamber, wherein at least one of the walls includes a transparent portion;
   a first receptacle disposed within the vacuum chamber, the first receptacle defining a space for receiving one or more microfluidic chips;
   a negative pressure source coupled to the housing and configured to reduce pressure within the vacuum chamber;
   a light source coupled to the housing and positionable to illuminate at least a portion of the space for receiving the microfluidic chip(s); and
   an optical sensor coupled to the housing and disposed outside of the vacuum chamber of the housing, wherein the optical sensor is configured to move relative to the housing outside of the vacuum chamber of the housing in at least two orthogonal directions and is positionable to capture an image of at least a portion of the space for receiving the one or more microfluidic chips through the transparent portion of at least one of the walls.

2. The apparatus of claim 1, wherein:
   at least one of the walls defines an opening;
   the housing comprises a door that is movable between an open position in which the door permits access to the vacuum chamber through the opening and a closed position in which the door prevents access to the vacuum chamber through the opening.

3. The apparatus of claim 2, comprising:
   a tray that is movable into and out of the vacuum chamber through the opening;
   wherein the first receptacle is coupled to or defined by the tray.

4. The apparatus of claim 3, wherein the tray is slidably coupled to at least one of the walls of the housing.

5. The apparatus of claim 3, wherein the tray is coupled to the door such that movement of the door between the open and closed positions moves the tray into and out of the vacuum chamber.

6. The apparatus of claim 2, wherein, while the door is in the closed position, the first receptacle is immovable in at least two orthogonal directions relative to at least one of the walls of the housing.

7. The apparatus of claim 2, comprising a seal coupled to the housing such that, when the door is in the closed position:
   the seal is disposed around the opening and in contact with the door; and
   reducing pressure within the vacuum chamber urges the door against the seal.

8. The apparatus of claim 1, comprising a heating element disposed within the vacuum chamber.

9. The apparatus of claim 1, wherein:
   the apparatus comprises a second receptacle disposed within the vacuum chamber, the second receptacle defining a space for receiving one or more microfluidic chips; or
   the first receptacle defines a space for receiving two or more microfluidic chips.

10. The apparatus of claim 1, wherein the light source is fixed relative to the optical sensor such that the light source is movable relative to at least one of the walls of the housing in at least two orthogonal directions.

11. The apparatus of claim 1, comprising:
   one or more first rails that each extend in a first direction and one or more second rails that each extend in a second direction that is perpendicular to the first direction;
   wherein the optical sensor is slidably coupled to the first rail(s) and to the second rail(s) such that the optical sensor is configured to slide in the first direction and in the second direction.

12. The apparatus of claim 11, comprising:
   a first base slidably mounted on the first rail(s); and
   a second base slidably mounted on the second rail(s);
   wherein the second rail(s) are fixed to the first base and the optical sensor is coupled to the second base.

13. The apparatus of claim 12, wherein the light source is coupled to the second base.

14. The apparatus of claim 12, comprising:
a first actuator configured to slide the first base in the first direction; and
a second actuator configured to slide the second base in the second direction.

15. The apparatus of claim 1, comprising:
a tube; and
a mirror assembly positionable under the space for receiving the microfluidic chip(s) and configured to direct light received from the space through the tube and to the optical sensor.

16. The apparatus of claim 15, wherein:
the tube extends in a first direction; and
the apparatus comprises an actuator configured to move the tube and mirror assembly in the first direction relative to the optical sensor.

17. The apparatus of claim 1, wherein the light source is configured to emit light having a spectrum in which:
the peak wavelength is between 515 and 545 nanometers (nm); and/or
at least 90% of the emitted light has a wavelength that is between 450 and 600 nm.

18. The apparatus of claim 17, comprising one or more filters positioned such that light emitted from the light source must pass through the filter(s) before reaching at least a portion of the space for receiving the microfluidic chip(s), the filter(s) including:
a long-pass filter that is transmissive over a spectrum spanning between a threshold wavelength and 900 nm and is not transmissive over a spectrum spanning between 300 nm and a wavelength that is less than the threshold wavelength, wherein the threshold wavelength of the long-pass filter is between 575 and 595 nm; and/or
an interference filter that is transmissive over a spectrum spanning between lower and upper threshold wavelengths and is not transmissive over:
a spectrum spanning between 300 nm and a wavelength that is less than the lower threshold wavelength of the interference filter; and
a spectrum spanning between a wavelength that is greater than the upper threshold wavelength of the interference filter and 900 nm;
wherein the lower threshold wavelength of the interference filter is between 490 and 510 nm and the upper threshold wavelength of the interference filter is between 530 and 550 nm.

* * * * *